US011185956B2

(12) United States Patent
Alberti

(10) Patent No.: US 11,185,956 B2
(45) Date of Patent: *Nov. 30, 2021

(54) FORCE RESPONSIVE POWER TOOL

(71) Applicant: John Alberti, Corvallis, OR (US)

(72) Inventor: John Alberti, Corvallis, OR (US)

( * ) Notice: Subject to any disclaimer, the term of this patent is extended or adjusted under 35 U.S.C. 154(b) by 245 days.

This patent is subject to a terminal disclaimer.

(21) Appl. No.: 16/502,997

(22) Filed: Jul. 3, 2019

(65) Prior Publication Data

US 2019/0337109 A1 Nov. 7, 2019

Related U.S. Application Data

(63) Continuation of application No. 14/769,027, filed as application No. PCT/US2014/029559 on Mar. 14, 2014, now Pat. No. 10,384,323.

(60) Provisional application No. 61/802,260, filed on Mar. 15, 2013.

(51) Int. Cl.
| | |
|---|---|
| *G05B 19/402* | (2006.01) |
| *B23Q 15/08* | (2006.01) |
| *B25B 21/00* | (2006.01) |
| *B25B 23/14* | (2006.01) |
| *B25F 5/00* | (2006.01) |

(52) U.S. Cl.
CPC ............. *B23Q 15/08* (2013.01); *B25B 21/00* (2013.01); *B25B 23/14* (2013.01); *B25F 5/00* (2013.01); *G05B 19/402* (2013.01); *G05B 2219/35437* (2013.01); *G05B 2219/37355* (2013.01); *G05B 2219/37372* (2013.01); *G05B 2219/45127* (2013.01)

(58) Field of Classification Search
None
See application file for complete search history.

(56) References Cited

U.S. PATENT DOCUMENTS

| | | | | |
|---|---|---|---|---|
| 4,547,847 A | * | 10/1985 | Olig ................... | G05B 19/4163 700/52 |
| 5,116,168 A | * | 5/1992 | Aihara ............... | G05B 19/4163 408/1 R |
| 6,161,055 A | * | 12/2000 | Pryor ................. | G05B 19/4065 382/152 |
| 6,516,693 B1 | * | 2/2003 | Thiele ................. | B23Q 15/013 83/13 |
| 6,535,788 B1 | * | 3/2003 | Yoshida ........... | G05B 19/40931 700/191 |

(Continued)

*Primary Examiner* — Jason Lin
(74) *Attorney, Agent, or Firm* — Timothy F. Myers

(57) ABSTRACT

A tool for operating on a workpiece includes a motion actuator and a controller that responsively varies a speed of the motion actuator and an operating speed of a working surface. The controller is configured to respond to a derived force that is a function an applied force exerted by an operator to manageably adjust pressure on the working surface to achieve a rate of work. The controller changes simultaneously both a rate of work on the workpiece and the operating speed of the working surface according to a sensitivity profile. The simultaneous change of rate of work and operating speed is manageable under both acceleration and deceleration by the operator with the applied force. The sensitivity profile expresses a relationship of a monotonically increasing positive slope between the derived force and the operating speed of the working surface within the range.

26 Claims, 13 Drawing Sheets

(56) References Cited

U.S. PATENT DOCUMENTS

| | | | | |
|---|---|---|---|---|
| 8,939,234 B2* | 1/2015 | Mebane, III | ............ | E21B 44/02 175/57 |
| 9,605,409 B2* | 3/2017 | Gudat | .................. | G05D 1/0278 |
| 2004/0003930 A1* | 1/2004 | Meixner | .............. | B25D 11/125 173/48 |
| 2004/0200628 A1* | 10/2004 | Schmitzer | ............ | B25D 16/006 173/1 |
| 2011/0218668 A1* | 9/2011 | Morfino | ............. | G05B 19/4163 700/174 |

* cited by examiner

Example Control System Response to Change of Derived Force 90

| T 91 | Event 92 | RPM 93 | Load 94 | Measured Current 95 | Mode, PWM 96 | Controller Notes 97 | Other Notes 98 |
|---|---|---|---|---|---|---|---|
| 0 | | 1,000 | 100 | 1,000 | Driving, 50% | Initial steady state drive PWM % is from stored Sensitivity curve. | Start at steady state. |
| 1 | Start to pull away workpiece | 1,100 | 90 | 900 | Driving, 50% | Current (Load) drop is detected | RPM increase due to decreased Load. Load decreasing 100 N*cm/s |
| 2 | | 900 | 80 | ? | Braking, 10% | Braking % is set by previous rate of current drop. Can't measure current when braking. | RPM = (1,100 - 200 (Brake) - 100 (loss of drive) + 100 (Lower load)) |
| 3 | | 950 | 70 | 700 | Driving, 25% | Driving PWM decreased to 50% of normal after Braking, allows current measurement without strong drive. | RPM = (900 - 50 (low drive) + 100 (Lower load)) |
| 4 | | 700 | 60 | ? | Braking, 15% | Braking % increased because current still dropping. | RPM = (950 - 250 (Brake) - 100 (loss of drive) + 100 (Lower load)) |
| 5 | | 700 | 50 | 500 | Driving, 12.5% | As before, Drive PWM % at half of normal for 500 mA. (In steady state) | RPM = (700 - 75 (low drive) + 75 (Lower load)) |
| 6 | Workpiece pressure constant | 400 | 50 | ? | Braking, 15% | Braking % remains high because current still dropping. This makes an RPM undershoot. | RPM = (700 - 200 (Brake) - 100 (loss of drive)) |
| 7 | | 350 | 50 | 500 | Driving, 12.5% | 12.5% is, for this example, minimum drive to get reliable current reading. | RPM = (400 - 50 (low drive)) |
| 8 | | 450 | 50 | 500 | Driving, 25% | Current is same as last reading, so Drive % is set at value from Sensitivity curve. | RPM = (350 + 100 (correct drive)) System is catching up |
| 9 | | 500 | 50 | 500 | Driving, 25% | Back at proper steady state (RPM steady state lagged control loop steady state.) | Back at proper steady state |

Fig. 8

FORCE RESPONSIVE POWER TOOL

CROSS REFERENCE TO RELATED APPLICATIONS

This application is a continuation of prior application Ser. No. 14/769,027, filed Aug. 19, 2015, entitled "FORCE RESPONSIVE POWER TOOL", now U.S. Pat. No. 10,384,323, which is a 371(c) National Stage Entry of prior PCT Application No. PCT/US14/29559, entitled "FORCE RESPONSIVE POWER TOOL", filed Mar. 14, 2014, which claimed the benefit of prior provisional application 61/802,260, filed Mar. 15, 2013, entitled "LOAD-RESPONSIVE SPEED CONTROL SYSTEM FOR POWER TOOL MOTORS", and all above Applications are hereby incorporated within by reference.

BACKGROUND

When skilled machinists or artisans are making fine objects requiring meticulousness or perfectionism, they often find conventional power tools to be of limited use due to safety and work quality concerns. They often resort to using less efficient finishing tools that provide them with more control and finesse in the creation of fine-crafted workpieces.

BRIEF DESCRIPTION OF THE DRAWINGS

The description is better understood with reference to the following drawings. The elements of the drawings are not necessarily to scale relative to each other. Rather, emphasis has instead been placed upon clearly illustrating the description examples. Furthermore, like reference numerals designate corresponding similar parts through the several views.

FIG. 8 is a table for a simplified example implementation of a control system;

DETAILED DESCRIPTION

Figure 1:
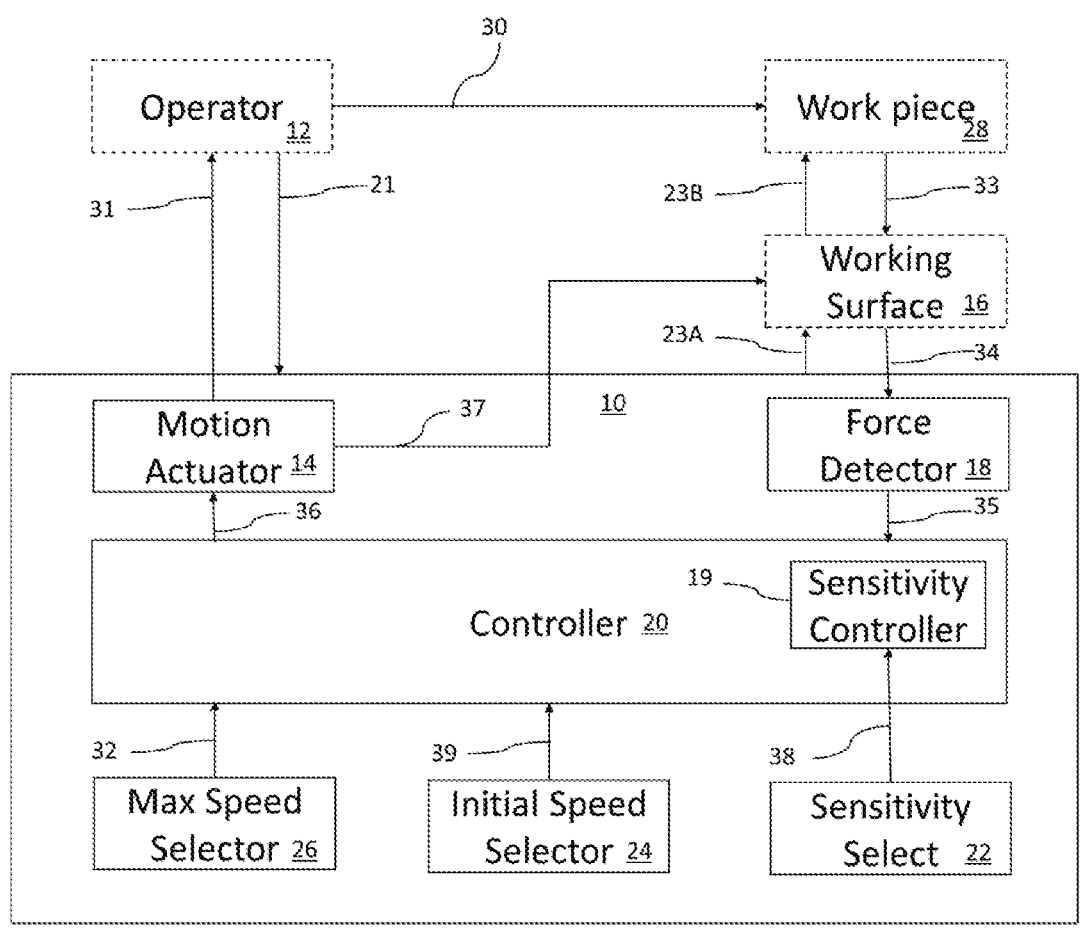
FIG. 1 is a block diagram of an example tool which an operator may use to fashion a workpiece incorporating the concepts described herein.

It should be noted that the drawings are not true to scale. Further, various parts of the elements have not been drawn to scale. Certain dimensions have been exaggerated in relation to other dimensions in order to provide a clearer illustration and understanding of the present described examples.

In addition, although the examples illustrated herein are shown in two-dimensional views with various regions having height and width, it should be clearly understood that these regions are illustrations of only a portion of a device that is actually a three-dimensional structure. Accordingly, these regions will have three dimensions, including height, width, and depth, when incorporated in an actual device.

A new power tool concept described herein has been created that allows a human or machine operator to control and operate the power tools with greater finesse to provide a more manageable and accurately controlled rate of work on the workpiece that can be comparable to the use of manual tools, yet executed with the efficiency and productivity of modern power tools. The term "rate of work" herein refers to either material removal rate, or the rate of material surface alteration such as in buffing, or other surface finishing due to heat and pressure, or combinations thereof. The rate of work is related to the functional or operating speed at a working surface on the power tool and the level of pressure applied by the operator, or proxy, to the tool. "Functional speed" or "operating speed" as used herein refers to the rotational or linear mechanical displacement rate (the rate of change of its position) or combinations thereof of the working surface with respect to time. Units of functional or operating speed may include revolutions per minute (RPM) as a measure of the frequency of a rotation or rotational speed such as with drills, rotary sanders, etc. RPM represents the number of turns completed in one minute around a fixed axis. Units of functional or operating speed may also include oscillations per minute (OPM) for reciprocating working surfaces such as with jigsaws, vibrating sanders, etc. Simple linear speed units (velocity such as feet per minute) may be used for functional or operating speed in such tools as band saws, belt sanders, etc.

These new power tools allow an operator to more finely determine a desired rate of work and operating speed of the power tools by adjusting the amount of force exerted between a workpiece and a working surface. In fact, at low workpiece forces, these new tools allow for reducing the rate of work by as much as one-half and generally more, compared to typical embodiments, while the rate of work at the maximum operating speed of the new tools is substantially the same as a fixed speed conventional tool. Such improved control by an operator of the new power tool also allows for fine manual adjustment of the placement of the workpiece with respect to the power tool, especially at first workpiece contact with the tool. By allowing for increased operator control over rotary, linear, or reciprocating motion of a power-driven tool's working surface, the rate of work as a function of tool speed and force (also referred to as pressure or load) between the tool and the workpiece is far more accurately controlled by an operator than with existing power tools, allowing for more efficient and accurate fine-crafting of workpieces. Also, energy may be conserved by allowing the new power tools to return to an initial speed once workpiece force is reduced or removed.

For instance, with existing power tools, when a workpiece first contacts a quickly moving working surface, the workpiece is often gouged, jerked, or otherwise misengages with the working surface of the tool. This problem is solved or greatly reduced with tools made incorporating the technique of the power tool 10 examples. This new technique allows for an improved motion actuator operating speed control that, as opposed to currently available modes of motor speed control, is workpiece load-responsive throughout its entire operating range. The technique described herein is applicable to all types of power tool tasks with various types of working surfaces that modify or remove workpiece material, such as sanding, grinding, drilling, honing, buffing, polishing, and saw-cutting just to name a few. Accordingly, a working surface includes, but is not limited to, a finishing surface, a cutting surface, a machining surface, a polishing surface, a buffing surface, or other material modifying surface. The working surface may be a single item such as a drill bit, or it may be an assembly of multiple parts such as with a sanding assembly, which may also include additional inertia. The power tool can include specialty medical powered tools to increase the productivity and skill of a dentist, dermatologist, or other operator. Additionally, the work-piece may include biological surfaces such as teeth and skin, and the working surface may be a tooth drill, a tooth polisher, a skin buffer, or dermal removal pad as a few examples.

The workpiece force aspect of the speed control can be determined from detection of a force or moment of force (such as torque or a levered force) that is imposed on the tool by an operator through the workpiece with a force detector. One advantage to this new technique is improved manual control of a power tool applied to a stationary workpiece by the operator. Another advantage is improved manual control over the handling of a workpiece manually fed by the operator to a stationary power tool having a motion actuated working surface. Such improved control allows for the reduction or elimination of secondary sanding, honing, filing, or other operations to create finely crafted precision workpieces that are now typically finished by hand with less efficient finishing tools, or with multiple machine operations. Yet another advantage is increased safety in the operation of a power tool.

As an example in an existing tool, such as a fixed-speed sander, a sanding disc typically rotates with such high speed that an operator has to gingerly or lightly hold the workpiece to the sanding wheel so as to avoid accidentally gouging, marring, over-cutting, or mis-shaping the workpiece because of uncontrolled contact pressure and alignment. This poses two problems. First, without sufficient workpiece engagement force, manual control is diminished because the operator must rely on his/her fine motor skills so as to readily maintain the position and alignment of the workpiece while engaging it against the rotating wheel without unintentional removal of material. Second, once engaged, maintaining the alignment or constant change of the angle of the workpiece against the sanding wheel is difficult for the same reason, for example as in finely shaping a curved portion of the workpiece. The workpiece can also fly out of an operator's hand when increased pressure is applied to the rapidly moving fixed-speed sanding wheel. Selectable fixed-speed power tools can be operated at lower speeds to provide greater operator control, but at a severely lower efficiency. Operator controlled variable speed tools exist, but require the use of the operator's hand, foot, or knee to control speed and thus increase the skill, dexterity, and training needed to perform fine work.

In some examples with the concepts described herein, the workpiece force response can be tailored for delicate power tool operations such as finessing a workpiece by hand with a power sanding disc that requires a rate of work that is more controllable than is possible with existing power tools. In one example, an operator can press the workpiece to the sanding disc working surface to increase the speed or decrease the speed of the sanding disc in proportion to the pressure used, thereby manageably controlling the rate of abrasion according to the immediate demand for the rate of work. This ability of the operator to be in charge of controlling operating speed is done using a predetermined continuous response profile (or "sensitivity profile" or "sensitivity profile response" used herein for brevity), which may be single-valued or within a range of values. This sensitivity profile describes a relationship between the amount of pressure, load, force, or moment of force detected on the working surface and the tool's response, such as operating speed of the working surface or tool output power. The sensitivity profile, or sensitivity profile response, while a relationship of derived force between the workpiece and the working surface and observed work rate by an operator, may be implemented as a 'derived force' vs. 'motion actuator' power function where power to the motion actuator is calibrated or otherwise characterized to achieve an estimated operating speed of a working surface for engaging the workpiece.

Multiple or 'two or more' sensitivity profile responses may be available for the operator to select from with the new power tool. For example, the operator may select a relatively flat slow speed transition region which changes over to a gradually increasing region that further tapers to a gradually flattening region at the maximum speed of the motor. The various sensitivity profile settings which select a desired sensitivity profile begin from a minimum or initial speed and extend to a final speed. The initial speed setting can be fixed or pre-set by the operator and can include zero speed. A maximum speed setting can also be fixed, pre-set by the operator, or governed by the maximum torque of a motion actuator.

More generally, a power tool for operating on a workpiece is handled by a human or machine operator. A motion actuator of the tool is mechanically coupled to a working surface that is configured to engage the workpiece. A controller is coupled to the motion actuator to control either speed of the working surface or the amount of power delivered by the motion actuator to the working surface. A force detector is coupled to the controller and configured to represent a derived amount of force, which represents the force or moment of force applied between the workpiece on the working surface by the operator. The controller, configured with a predetermined continuous response profile (sensitivity profile or sensitivity profile response), allows the operator to manageably control with finesse simultaneously both a rate of work on the workpiece and a speed of the motion actuator with the amount of force, or moment of force, applied between the workpiece and the working surface. The controller may control an operating speed of the motion actuator based on a sensitivity profile with respect to the amount of force the workpiece exerts at the working surface, and increase the amount of force required to achieve a particular rate of work on the workpiece (compared to a fixed speed tool operating at the max speed). Accordingly, the controller allows for a lower rate of work (compared to a fixed speed tool operating at the max speed) for substantially all derived amounts of force greater than zero and less than a max derived amount of force at a max speed for the new power tool.

The force detector determines and outputs a signal that represents the amount of force, or moment of force, or pressure applied between the workpiece and working surface. This force may be either direct or indirect, such as by applying pressure to a tool which engages the workpiece and transfers at least a portion of that applied pressure onto the workpiece. There are several techniques to detect the force applied to the workpiece and derive an estimation or representation of such detected force to create a "derived force." One approach is to sense a change in the motion actuator load (such as moment of force), which represents the "workload force" on the workpiece, which is a function of the actual force exerted by the operator. Another way is to sense a related electrical motor parameter such as current, phase lag, or frequency lag, or other parameter, depending on motor type. Another way is to sense the actual force of the workpiece on the tool's working surface. For instance, one could have a strain gauge in the tool that measures either the axial force (normal to a rotating or a reciprocating plane of a working surface) or the radial force on the motion actuator. Also, one could have a force sensor embedded in the workpiece (or attached to it) and relay the amount of actual force to the controller. A "derived force on the workpiece" is an input (see x-axis on FIGS. 3, 5A & 5B) to a controller implementing a speed or power sensitivity profile and having an expected operating speed of the tool (which an operator may observe) as the output (see y-axis on FIGS. 3, 5A & 5B) of the sensitivity profile.

The "derived force" is a representation of that force that is sensed or otherwise determined to be exerted by the workpiece, directly or indirectly, on the tool. Depending on how it is measured, it may represent either workpiece force on the working surface, or moment of force on the tool due to workpiece force, or a combination of these forces. For some tools, the moment of force on the tool (while also dependent on other factors) is a function of the axial force; in these cases, a zero axial force by the operator results in a zero moment of force on the tool. The force detector can be calibrated as needed to remove any non-linearities in the tool or tool's sensor(s), or keep them if desirable, depending on the design of the predetermined continuous response sensitivity profile. Further, there are multiple vectors or moments of force that may be detected but the "derived force" will be at least a partial function of the actual force exerted by the operator, which is being used to control a speed or power level close to that indicated by a selected sensitivity profile. In some cases, an operator may apply an axial or radial force, which results in a moment on the tool, which may be measured by various means such as motor current or frame flex. The force detector might use one or more sensor signals or other techniques to estimate the operator applied force to the workpiece and algorithmically manipulate to a standard signal so the same controller may be used with multiple tools independent on how the "derived force" is actually sensed for a particular tool. Thus, the force detector output may be standardized, representing a predetermined force output function independent of how the amount of force the operator applies on the workpiece is derived. A minimum "derived force" may be zero or some non-zero value based on particular tool implementations.

If the sensitivity profile 50 is monotonically increasing, the controller is configured to increase, or not decrease, the power to the working surface (generally thereby increasing speed, aka acceleration, or not decreasing speed) when the force detector represents an increase in derived force; it also decreases the power to the working surface (generally thereby decreasing speed, aka deceleration, or not increasing speed) and/or applies braking to the motor actuator 14 when the force detector represents a decrease in force. If the sensitivity profile 50 is monotonically decreasing, the controller is configured to increase, decrease, or maintain the power to the working surface and/or apply braking to the motor actuator 14 when the force detector represents an increase in derived force, thereby generally decreasing speed, aka deceleration), and the controller is configured to increase, decrease, or maintain the power to the working surface (generally increasing speed, aka acceleration) when the force detector represents a decrease in derived force. The controller may allow for selection of an initial speed and/or a max speed. The predetermined continuous response or sensitivity profile to the amount of force applied by the operator to the workpiece on the working surface may be configured to only respond in a range between an initial speed and a max speed. The tool may include a sensitivity selector configured to apply one of 'two or more' sensitivity profiles that represent a particular predetermined continuous response profile selected by the operator, or the tool might have a continuously variable potentiometer or switched values as a user input to vary the sensitivity profile.

The actual speed observed by the operator may not be exactly that reflected in the sensitivity profile. For instance, there may be some hysteresis within the controller for making a decision of when to change the power to the motion actuator to eliminate noise, sampling issues, component variances, and time delays due to processing, inertia, etc. Other errors may occur due to part variances and frictional losses. Also, the controller, in the process of implementing the sensitivity profile, typically needs time to measure and react, also, the working surface and the assembly that attaches to the working surface has non-zero inertia that slows convergence to new speed values; therefore, there are likely to be temporal offsets from the desired sensitivity profile. Further, one advantage of the power tool 10 examples is that the actual speed observed by the operator need not be perfectly matched to the predetermined continuous response profile as the operator will manageably adjust workpiece pressure as necessary to get a desired speed and rate of work. Accordingly, the controller may be configured to adapt the speed of the motion actuator within a sufficient time period to substantially allow the operator to manageably control with finesse under both acceleration and deceleration the rate of work on the workpiece based on an applied force the operator exerts on the workpiece to the working surface.

Accordingly, the concepts described herein enable a power tool that can extend an artisan's natural crafting abilities to machine fashioned articles, expanding the amount, type, and conception of artistic creations possible while also reducing the effort, time, and focus needed to create works of art or accurately made utilitarian articles. In fact, the one or more predetermined continuous responses or sensitivity profiles allow any electrical, mechanical, or other tolerances of the motion actuator, controller, and force detector to be compensated for by the finessed control of the artisan operator. By allowing the operator to contribute to the feedback within the motion actuator control system, not only is the ability and productivity of the artisan operator increased, but unwanted tolerances, wear factors, or other machine inaccuracies can be compensated by the operator's finessed input, thereby lowering ongoing maintenance of the tool. An added bonus is that energy is also conserved due to average lower operating speeds thereby further reducing operating costs.

FIG. 1 is an example block diagram of a tool 10 with a working surface 16 that implements the concepts described herein. The working surface may be an abrasive surface, a drill bit, a saw blade, a knife blade, a polishing surface or other material finishing surface. The tool 10 actuates a working surface 16 which operates on a workpiece 28, either by having an operator 12 apply an operator force 30 on the workpiece 28 which transfers force to the working surface 16 or by having the operator 12 apply an operator-tool force 21 on the tool 10 and the tool indirectly applying that force on the workpiece 28 via indirect tool forces 23A to the working surface 16 and 23B from the working surface 16 to the workpiece 28. The tool 10 may include the working surface 16, which is configured to engage the workpiece 28 but the tool 10 may be alternately configured to couple to working surface 16 so it can be interchanged as necessary. A motion actuator 14 is coupled 37 to the working surface 16. The motion actuator 14 can be a rotary motor, such as a brushless DC, brushed DC, single or multiphase AC, a pneumatic motor, or hydraulic motor, just to name a few. Also, motion actuator 14 could be a linear actuator such as an electrical solenoid, a reciprocating motor, a pneumatic linear actuator or a hydraulic linear actuator, just to name a few.

A controller such as controller 20 is coupled 36 to the motion actuator 14 to control the amount of power or speed delivered by the motion actuator 14 to the working surface 16. A force detector 18 is coupled to the controller 20 and is configured to receive a force value 34 that represents the force, load, or pressure on the working surface 16, which an operator 12 applies from the workpiece 28 onto the working surface 16 and outputs a signal that represents a derived force 35. The controller 20 may include an inherent or explicit sensitivity profile 50 expressing a relationship between the derived amount of force and the operating speed of the working surface, under both acceleration and deceleration. The controller 20 may also have a sensitivity controller 19 implementing the sensitivity profile 50 to allow the operator 12 to control with finesse simultaneously both a rate of work from the workpiece and a speed of the motion actuator 14 based on a predetermined continuous response in sensitivity profile 50 (see FIG. 3 and FIGS. 5A & 5B) to the amount of force applied by the operator 12 on the workpiece 28 at the working surface 16.

The controller 20 may be configured to increase the speed of, or power to, the working surface 16 via motion actuator 14 when the controller 20 and force detector 18 determine an increase in force above a first predetermined amount and to decrease the power to the working surface 16 when the controller 20 and force detector 18 determines a decrease in force above a second predetermined amount.

The force detector 18 may be a standardized force detector representing a predetermined force-output function independent of how the amount of direct force 30 (or indirect forces 21 and 23A and 23B) the operator 12 applies on the workpiece 28 is derived. For instance, there are several methods of detecting the amount of direct force 30 (or indirect forces 21 and 23A and 23B) applied to the workpiece. For instance, there may be a rotational torque sensor on the motion actuator 14. Alternatively a strain gauge could be used to sense the linear or rotational force applied to the working surface. A strain sensor within the workpiece or attached to the workpiece can transmit a wired or wireless signal to the force detector 18. If a pneumatic or other fluid based system is used such as with hydraulics, the pneumatic or hydraulic pressures can be sensed and sent to the force detector. In addition, if an electrical motion actuator is used, a voltage sensor, current sensor, power sensor, frequency sensor, phase sensor, or other electrical property sensor could be used. Accordingly, as there are many different possible ways to sense or otherwise derive the force the operator applies to the workpiece, the force detector may convert a received signal into a standard format so that the controller 20 programming does not necessarily need to be updated for different types of tool implementations.

Figure 4:
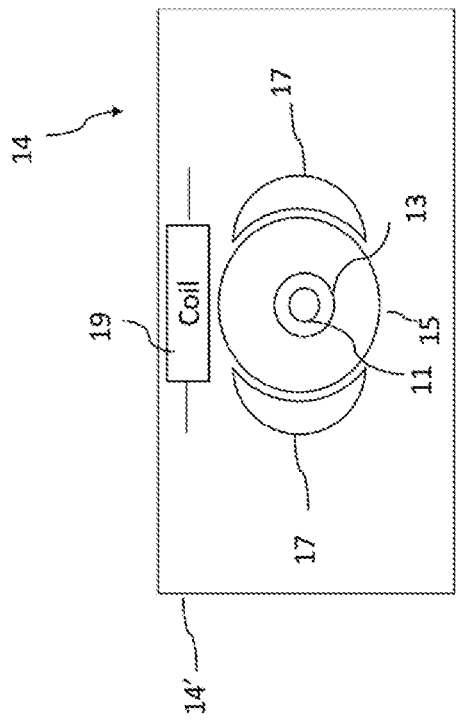
FIG. 4 is a drawing of an example motion actuator with example braking mechanisms.

If the motion actuator 14, working surface 16, or rotating attachments to the working surface 16, on tool 10 have a high inertial momentum, the tool's motion actuator 14 may include a brake (17, 19 in FIG. 4). The controller 20 may be configured to at least partially apply the brake (17, 19) when the controller 20 determines the need to reduce speed. In addition, the controller 20 of tool 10 may be configured to alternately apply the brake (17, 19) and the amount of power to the motion actuator 14 when a need for speed reduction is determined. The brake or other deceleration mechanism allows the controller 10 to adjust the motion actuator 14 speed in sufficient time to allow the tool operator to manageably change simultaneously both the rate of work on the workpiece and the operating speed of the working surface even when the moving components of the tool have a high inertial momentum.

Other possibilities to configure controller 20 are possible. The controller 20 may allow for selection of an initial speed as a minimum speed using an initial speed selector 24 via an initial speed input 39 and a max speed using a max speed selector 26 via a max speed input 32. The sensitivity profile 50 (see FIG. 3) applied to the amount of force on the workpiece at the working surface may be configured to only vary in a range between a selected initial speed and a selected max speed. However, there may be multiple sensitivity profiles 50 (see FIGS. 5A, 5B, & 5C) available for an operator to choose from depending on operator preference and the type of work to be performed on the workpiece. This selection can be done with a sensitivity selector 22 via a sensitivity input 38. The sensitivity selector 22 may be configured to select and apply one of two or more sensitivity profiles (see examples in FIGS. 5A & 5B) that represent the desired predetermined continuous response 50. While the sensitivity profile 50 may represent the relationship between the derived force on the work-piece 28 and observed speed or power (as a proxy) applied to the motion actuator 14, the controller 20 of tool 10 may control the power to the motion actuator 14 in discrete steps over multiple time periods that approximate the sensitivity profile 50 with a digital calculation, reference look-up, or table to set the operating speed of the working surface. The controller's 20 use of the sensitivity profile 50 allows any tolerances and other variability of the motion actuator 14, controller 20, and force detector 18 to be compensated for by the finessed control of the operator 12 as he/she applies their artisan or skilled abilities to the workpiece 28 or tool 10.

In an example where a power source to motion actuator 14 is pneumatic or hydraulic rather than electric or a hybrid of electric, pneumatic, hydraulic, or combinations thereof, the controller 20 may be a pneumatic, hydraulic, or hybrid logic controller that is an analog of a corresponding electronic control. For instance, a hydraulic or pneumatic pressure transducer as force detector 18 in the system can sense torque or axial force. This force detector 18 can then control various pneumatic or hydraulic controllers such as a hydraulic or pneumatic amplifier, a proportional valve for direct control, and a flow regulator or pressure regulator just to name a few example non-electronic controllers 20. In some of these controllers 20, the sensitivity profile 50 may be inherent in the design of the system and express a relationship between the derived amount of force and the operating speed of the working surface, under both acceleration and deceleration. In other controllers 20, a sensitivity controller 19 may explicitly implement the sensitivity profile 50 and allow for tuning or selection of the sensitivity profile 50 for operator preference or work requirements.

Figure 2:
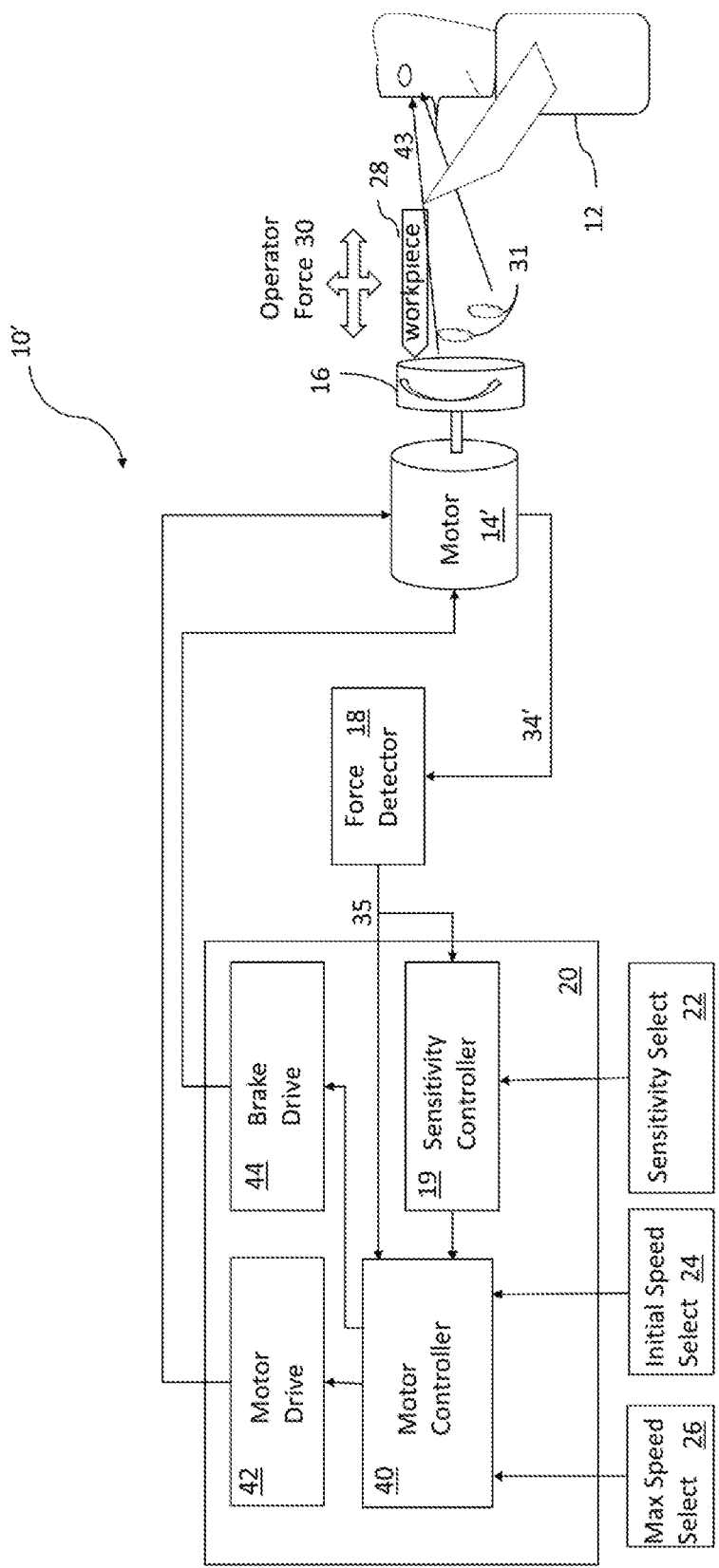
FIG. 2 is a block diagram of an example of a specific implementation of a tool incorporating the concepts described herein.

FIG. 2 is another example of a tool 10' having a controller 20 controlling a motor 14' (motion actuator 14), which is coupled to a working surface 16. In this example, the controller 20 has a motor controller 40 that accepts inputs from a max speed selector, max speed select 26, and a minimum speed selector, initial speed select 24. The controller 20 also includes a sensitivity controller 19 that accepts an input from sensitivity select 22 to allow for more than one sensitivity profile. The motor controller 40 is coupled to a motor drive 42 unit that is used to deliver power to motor 14'. The controller also has a brake drive 44 unit that is also coupled to the motor 14' in order to help slow down the motor. In some examples, brake drive 44 may not be required. Either of both the motor drive 42 and the brake drive 44 may include additional sensitivity profiles to help respond adequately to braking and acceleration.

The motor 14' is coupled to a force detector 18. The force detector 18 determines what operator force 30 is applied to the workpiece 28 by operator 12 by measuring motor current as a proxy force value 34' for motor load thereby creating derived force 35. The force detector 18, or controller 20 using force detector 18, may also determine the rate of change of operator force 30 or an estimation thereof (first time derivative) and/or determine the rate of the rate of change of operator applied force or an estimation thereof (second time derivative). Both the rate of change and rate of the rate of change of the operator applied force may be positive or negative. In some examples, this force detector 18 may have a standardized output for derived force 35 such that the input to force detector 18 may come from one or more different sensors or other detection mechanisms yet provide a compatible standard output to the controller 20. The operator 12 can observe either the speed 43 of the working surface 16 or the rate of work 31 (material removal in this example) from the workpiece 28 or both. To get the desired rate of work, in some configurations the operator can adjust the location of the workpiece 28 on the working surface and/or the force asserted on the workpiece to change of the speed of the tool 10.

The sensitivity select 22, max select 26 and the initial select 24 may include switches, potentiometers or other devices to allow for multiple or variable selections. If needed or desired, an analog to digital (A/D) or digital to analog (D/A) conversion circuit can be implemented between the max select 26, initial select 24, sensitivity select 22 and the controller 20. Other interfaces, to and from the controller 20, may include signal filters, D/A, or A/D circuits.

Figure 3:
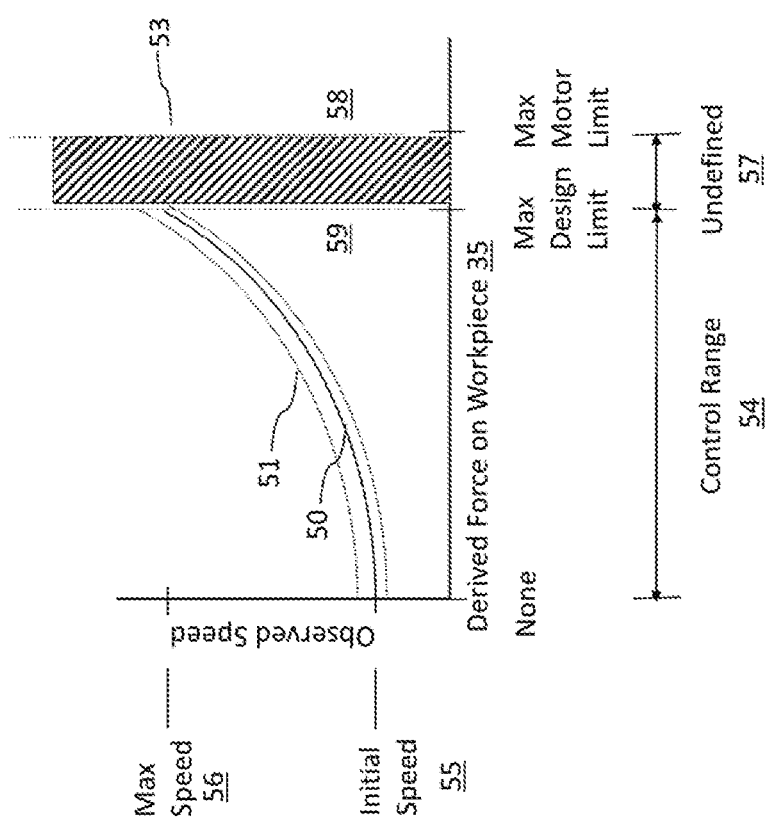
FIG. 3 is an example of observed speed curve vs. derived force used in one example.

FIG. 3 is an example chart detailing the observed speed of the working surface 16 by the operator 12 based on a derived force 35 applied to the workpiece by the operator 12. The controller 20 may be configured to control the motor 14' within a control range 54, based on derived force 35. The control range 54 is bounded between a zero (none) derived force and a max derived force 59. The example of FIG. 3 shows a starting derived force of none or zero, corresponding to an initial speed 55, and a max derived force, corresponding to a max speed 56, the starting derived force may be larger than zero and the max derived force may be less than the tool's maximum possible derived force. The control region is bounded between an initial speed 55 when there is no or a minimum derived force 35 detected and a max speed 56 when there is a maximum derived force 35 detected. In some examples of tool 10, these bounds may be fixed limits. In other examples one or both the max speed and initial speeds may be set by an operator or other person or device. When the tool 10 is powered and the workpiece 28 is not in contact with the working surface 16, the derived force is usually determined to be none or zero (0) though there could be a non-zero minimum derived force that represents motor inefficiencies at initial speed 55, other frictional effects, or noise floors. This results in the controller outputting a power to the motor 14' (or other motion actuator 14) to operate the tool 10 at the initial speed 55. As operator force 30 exerted by the operator 12 on the workpiece 28 is sampled or otherwise derived, the speed of the motor 14' is adjusted by changing the amount of power supplied to the motor 14' by the controller 20 according to sensitivity profile 50, between the zero derived force and a maximum derived force 59, when the max speed 56 is reached. In this example, once the max speed 56 is reached, the controller 20 response is undefined 57 and can vary depending on various implementations and could maintain max speed, drop off, or continue to increase to the max motor limit 58. In other examples, there may be no max speed 56 imposed and the controller will follow a sensitivity profile 50 until a max derived force 59 at the max motor limit 58 is reached. In some examples, sensitivity profile 50 may be a sensitivity profile range 51 due to variances of the motion actuator, the controller, the force detector, or by design. That is, an implemented sensitivity profile may not always have a single-valued response due to the variances or purposely by design. For instance, in some examples, the sensitivity profile range may be designed to have a random component to the sensitivity profile response in order to reduce electromagnetic interference (EMI) or help in control system stability.

FIG. 4 is an exemplary drawing of a motion actuator 14 configured as a motor 14' with one or more braking mechanisms. One type of braking mechanism may be a mechanical brake 17 which operates via frictional forces to slow the motor shaft 11 which is coupled to the working surface 16 via a coupling 13. Alternatively, or in addition to mechanical brake 17, one or more electrical brakes 19 can be used to apply a counter electromotive force on the rotor 15. Mechanical brake 17 may also be implemented using pneumatic and hydraulic components and may also be some hybrid of electrical, mechanical, pneumatic, or hydraulic components. Depending on the tool type, if the working surface is attached to a body or assembly having a high momentum or inertia, then simply reducing the power to the motor may not be sufficient to allow the tool to respond properly to the operator's change of load on the workpiece 28. By using braking along with intermittent power control in separate or same time intervals, the controller 20 is able to quickly and responsively match the speed of the motor to the sensitivity profile 50 as in FIG. 3 by using the derived force on the workpiece. By having the controller 20 quickly match the speed of the motor based the sensitivity profile 50, the operator is able to manageably change simultaneously both a rate of work on the workpiece and the operating speed of the working surface by applying a single force from the workpiece onto the working surface 16 of tool 10.

Figure 5A:
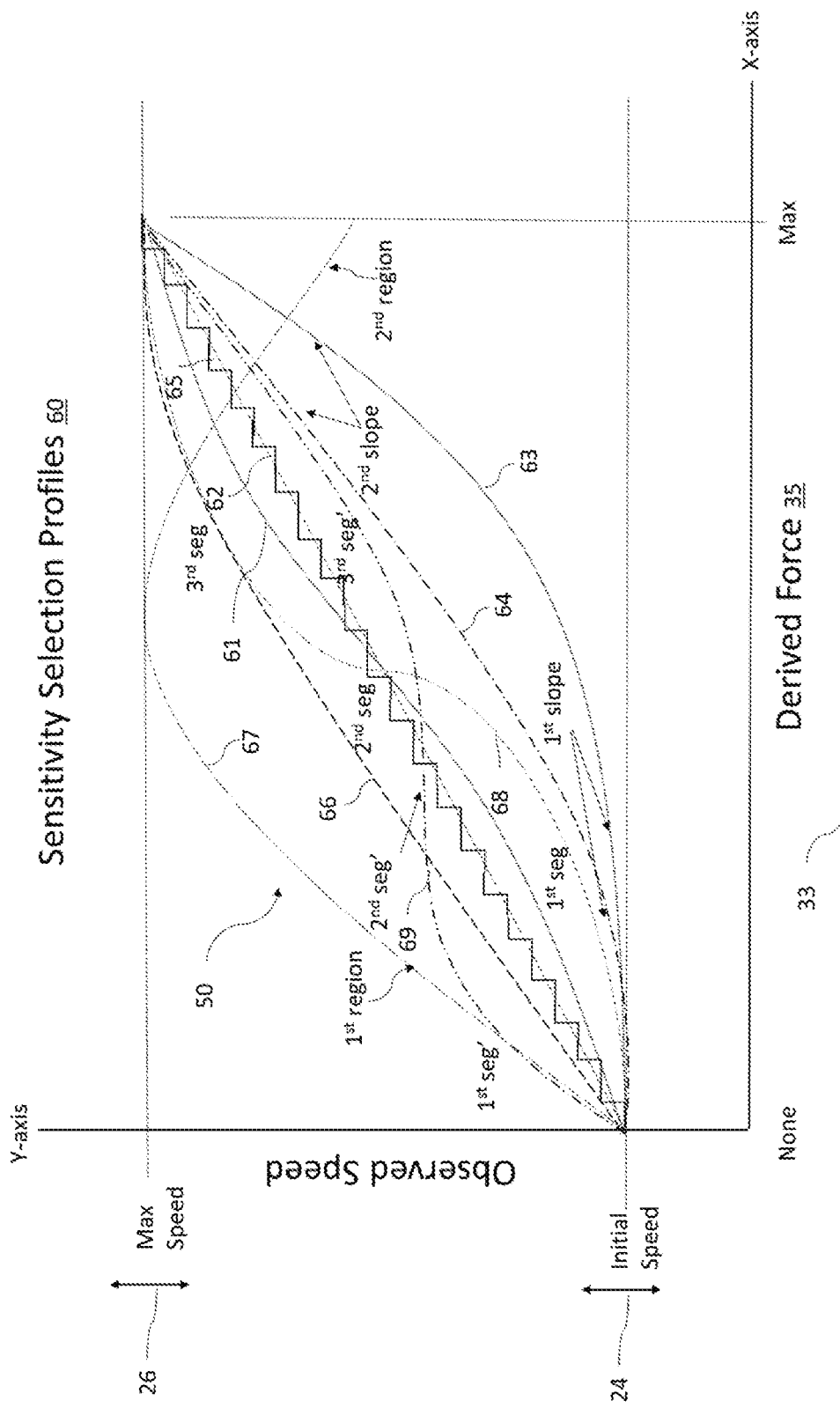
FIG. 5A is a graph showing several different types of example sensitivity profiles which may be used in various examples.

FIG. 5A is an example graph of various possible sensitivity selection profiles 50 (such as 61, 62, 63, 64, 65, 66, 67, 68, and 69) that provide different tool operating characteristics. Other sensitivity selection profiles are possible beside these examples. In addition, there may also be additional sensitivity profiles or look-up tables used to control braking and acceleration. In some tool examples, there may be two or more sensitivity profiles 50 to allow the operator to choose the derived force 35 along a derived force range 33 and respective motion actuator speed pairing between an initial speed 24 and max speed 26, both of which may be adjustable. Accordingly, the control system 20 can follow one of a plurality of predetermined and preset speed-force curves that are operator selectable. The sensitivity profiles 50 may be a family of substantially monotonically increasing curves of positive slope (but could also have some negative slope, a monotonically decreasing region, in some examples) and are predetermined single-valued (only one Y-axis value for each X-axis value) continuous responses, wherein the curve limits may be defined between an initial speed 24 and a max speed 26 which is greater than the initial speed 24. The max speed 26 may in some examples correspond to the maximum allowable torque of the motor or other motion actuator 14. The max speed 26 and initial speed 24 adjustments do not clip the sensitivity profile curves but rather just set the lower and upper speed bounds and the controller 20 scales the sensitivity profiles accordingly within the initial and max speed bounds.

By way of one example, if a sensitivity profile 50 is selected whereby the initial portion of the curve is relatively flat with load, such as lower tapered profile 64, a workpiece 28, such as the end of a wooden dowel, may be initially pressed against a sanding machine rotating at a slow finite initial speed with adequate pressure for workpiece alignment with the working surface. This speed-pressure or speed-load relationship allows the operator 12 to hold and align the workpiece 28 securely with respect to the working surface 16 of the disc, without the workpiece 28 jerking or skipping out of alignment (or from the operator's 12 grip) by cause of friction with a rapidly moving abrasive surface such as with conventional sanding or grinding machines. This lower tapered profile 64 also helps prevent gouging or otherwise accidentally causing unwanted material removal from the workpiece 28, as may be the case if the sanding disc were rotating rapidly upon initial contact with the workpiece. Thus, the operator 12 can confidently grasp the workpiece 28 while applying sufficient muscular force in the fingers and wrist to maintain control, and press the workpiece 28 against the sanding wheel with sufficient pressure so as to accurately make the initial alignment before any significant material removal 31 from the workpiece 28 occurs. This lower tapered profile 64 allows for an expansion in the exerted force range at low speeds to achieve a desired rate of work. Alternatively stated, the lower tapered profile 64 reduces the initial rate of work for a given exerted force on the workpiece than if that same force were exerted on a workpiece to a conventional fixed speed tool having a fixed speed at a speed above the initial engagement speed of the new power tool 10.

In a conventional tool example, an operator wielding a hand-held electric drill with a standard drill bit may contact the tip of the drill to a stationary workpiece with a smooth surface without the benefit of a pilot hole or center punch indentation. Normally, the drill bit working surface will wander from the initial point of contact when the drill motor is engaged. In this example, the drill has a zero initial speed; however, when the operator engages the drill bit on the surface and presses the trigger motor speed control, the speed of the motor increases rapidly to a fixed maximum speed, making the bit jerk or wander laterally as its tip is pulled along the surface, instead of embedding into the surface to start the hole. To control this somewhat, if the drill has a variable speed trigger control, the operator can partially press the trigger speed control to slow the rotation of the bit in order to prevent the bit from wandering. However, the operator must simultaneously apply pressure on the drill bit, which can stop the motor because the torque is low at low speeds.

The present power tool 10 examples allow the rotational speed of a drill to respond to the load on the motor by the pressure applied to the drill bit, rather than requiring drill trigger motor speed control by the operator. In this example using the power tool 10 examples, a sensitivity profile 50 is chosen to have a first slope of low value and at least a second slope of substantially higher value than the first such as with lowered taper profile 64 or extended lowered taper profile 63. This profile 63 increases the speed very slowly in response to increase derived force and then rapidly increases speed over a narrow range of derived force. Upon initial engagement, the operator first accurately centers the drill bit at zero initial speed, and then begins to increase pressure on the drill which transfers the force to the workpiece and the controller 20 gradually increases the rotational speed over an initial range of derived force. The gradual increase in drill speed with increasing load allows the bit to form a shallow indentation preventing the bit from wandering at higher speeds, yet the controller 20 maintains a high enough power level to overcome friction when the bit is pressed into the workpiece at slow speeds. As the operator 12 further increases the amount of force applied to the workpiece 28, the drill speed rapidly increases to a maximum speed according to the selected sensitivity profile 50. In this way, a hole can be drilled accurately on surfaces such as where pre-made guidance holes are not possible.

In one example, arch profile 67 may be advantageous with polishing or buffing tools. As shown, arch profile 67 has a curve that arcs up to a max speed with an applied derived force 35 less than the max possible derived force 35. The arch profile 67 then arches down somewhat at higher derived forces 35. When buffing out a workpiece and operating at or near the max derived force 35, the workpiece may tend to overheat. However, one might need continued high pressure to enable efficient action of the polishing media. With arch profile 67, one can polish at a high pressure and moderate speed, then back off on pressure, thereby having a lower derived force 35, and have the advantage of higher speed and low pressure to remove the polishing compound or give a better luster as a result of high speed and low friction. Accordingly, arch profile 67 may have a first region ($1^{st}$ region) where the operating speed is managed by the operator to control simultaneously the rate of work on the workpiece and the operating speed of the working surface, and a second region ($2^{nd}$ region) where the operator is able to also simultaneously control the rate of work on the workpiece and the operating speed of the working surface but wherein the operating speed is reduced as the operator applied force is increased in order to perform work at low speed and high friction, lower material removal rate, or limit workpiece temperature. The first region of arch profile 67 is monotonically increasing and the second region is monotonically decreasing. Accordingly, a sensitivity profile 50 may have at least one region with a monotonically decreasing region and possibly more depending on the desired response between the derived force 35 and the observed speed output. The high point of the arch may be set by the operator in some examples, in other examples, the high point may be set at manufacture, or by the tool based on temperature readings from additional sensors (not shown) coupled to the controller 20.

In another example, first s-shaped profile 68 may be advantageous with a reciprocating motion actuator 14, such as a hand-held jigsaw. In the case of the jig-saw, the blade motion is reciprocating, therefore, the frequency of the reciprocating motion is observed by the operator as its speed. When an operator 12 positions a blade of a jig-saw on a workpiece it can wander or jump at the beginning of a cut when the saw motor is engaged. However, with the power tool 10 examples, a hand-held jig-saw using a profile such as s-shaped profile 68 has a $1^{st}$ segment ($1^{st}$ seg) of slowly increasing speed with force followed by a $2^{nd}$ segment ($2^{nd}$ seg) of a faster increasing speed with force, and then followed with a $3^{rd}$ ($3^{rd}$ seg) segment of segment of slower increasing speed with force. This profile allows an operator 12 to accurately engage the jig-saw blade and apply whatever force is necessary to engage the blade with the work-piece and then apply additional force without causing the reciprocating blade to significantly increase its speed the until $2^{nd}$ segment is reached but maintain a desired rate of work depending on the thickness or hardness of the workpiece. If the operator encounters a region in the workpiece material where more precision is needed along with productivity, the operator 12 can increase the amount of force applied and enter the $3^{rd}$ segment which allows for more operator control than the $2^{nd}$ segment during periods of fast material removal.

The material removal rate is alternatively referred to in some scenarios as the workpiece feed rate as understood by those skilled in the art. Within usability bounds, the material removal rate increases with increasing motor speed and force applied to the workpiece 28 against the work interface of the power tool such as working surface 16. For the asymmetric s-shaped profile 68 example, the choice of speed-load slope transition values can determine how much operator force 30 to apply to the workpiece 28 to obtain a degree of fine control over the material removal rate and therefore the shaping of the workpiece 28. The degree of fine control is related to the experience and skill of the operator 12. In particular, the operator 12 relies on manual dexterity and experience to apply optimal force on the workpiece 28 to effect a material removal rate that is not too great and not too small. This material removal rate is a function of motor speed, for example the rotational speed of a disk sander, and workpiece pressure, and now the operator 12 can control the motor speed via the amount of operator force 30 applied to the workpiece 28. Advantageously, an operator's control in shaping a workpiece 28 is enhanced when the operator 12 can command the motor 14' to provide speeds that allow him or her to achieve optimal manipulation or finesse of a workpiece 28. The power tool 10 example FIG. 2 provides one or more sensitivity profiles 50 tailored to the controller 20 to automatically adjust the power or tool motor speed in order to allow optimal performance of the power tool 10 for various different work requirements.

In some examples, especially with digital or discrete controllers, the sensitivity profile 50 may have a stepped profile that approximates one of the continuous profiles in discrete or quantified values to allow for various ranges where speed is constant for a range of forces such as with stepped profile 65. The sensitivity profile 50 may also have a stepped profile due to digitization artifacts if implemented in a digital controller.

In another example, a second s-shaped profile 69 would allow for greater range of speed adjustment at low ranges of force in a first segment ($1^{st}$ seg'), followed by a second segment ($2^{nd}$ seg') with a lesser change in speed due to a change in force. This would allow an operator 12 to engage the work-piece at low speed and with additional force quickly settle into a higher speed range with a nearly constant or slightly increasing speed over a wide range of force. If substantially greater material removal is desired, the operator 12 can increase the force and operate in a third segment ($3^{rd}$ seg') that has a rapidly increasing speed to force ratio, allowing the operator 12 continued speed control but also greater productivity. In some examples, the speed-force profile can be straight throughout the entire derived force range such as with straight profile 62 or its digital approximation 65. In other examples, perhaps just the upper portion of the profile is tapered, such as in upper tapered profile 66, to allow the operator more control as he/she is approaching the load limit of the tool.

In addition to just having a set of sensitivity profiles 50 loaded into the tool 10 for selection by operator 12, other examples of tool 10 allow an operator 12 to adjust and thus predetermine the shape of the continuous response desired for a particular job. In this example, the operator 12 has the ability to manipulate the shape of the sensitivity curve at will. The operator 12 is presented a general speed-load or speed-force sensitivity profile curve on a display such as an LCD display. Using a cursor to move the slope transition points, the operator can freely select the slope transaction load values, expanding or compressing the rapidly increasing portion of the sensitivity profile. Moreover, the operator may also select the maximum and minimum motor speeds, changing the vertical extent of the speed-load or speed-force sensitivity profile. In this manner, the power tool 10 examples advantageously provides a technique to readily and easily adjust the speed of the power tool motion actuator 14 to suit the specific workpiece shaping operation.

Figure 5B:
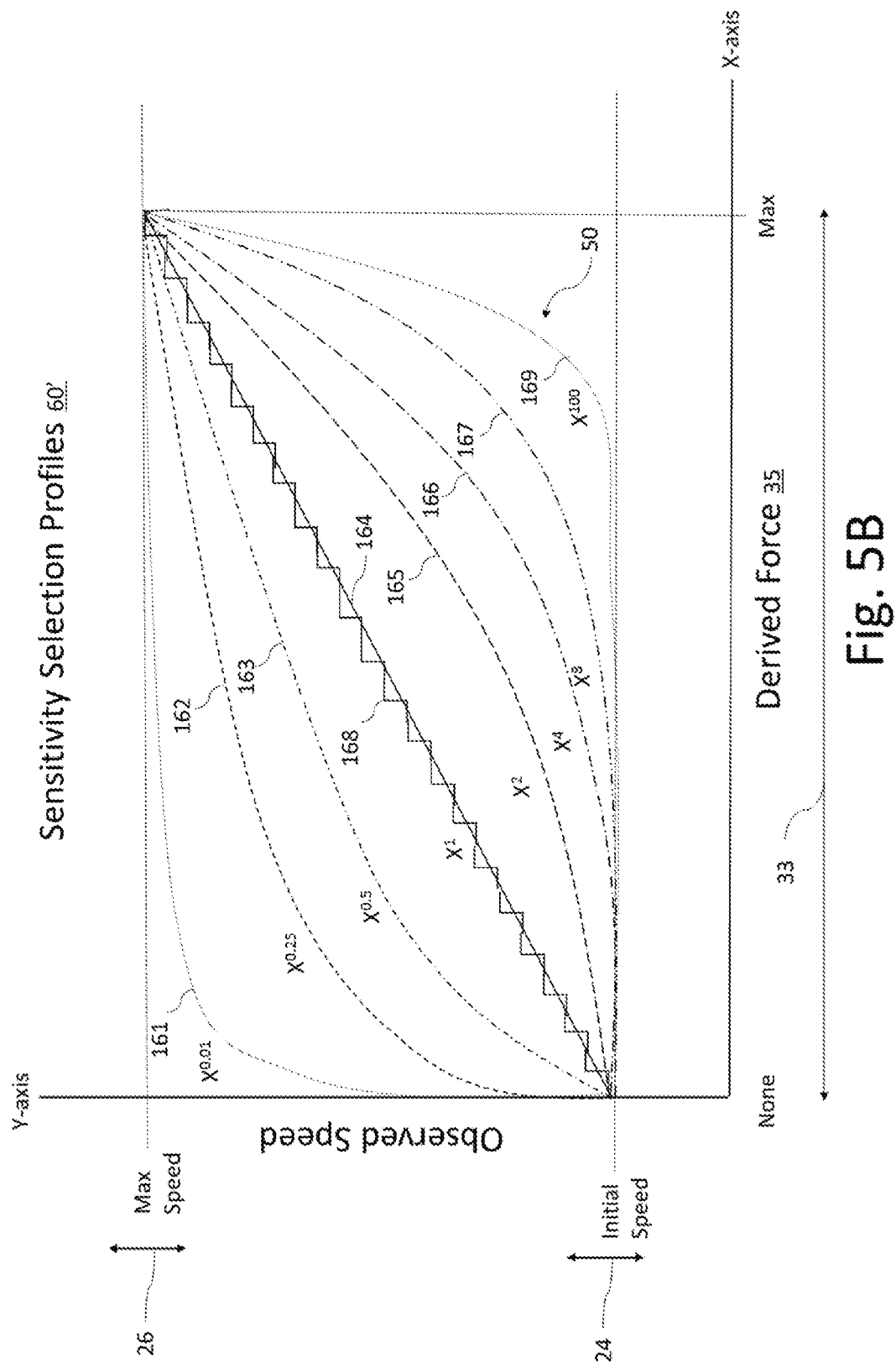
FIG. 5B is a graph showing several example sensitivity profiles based on a common formula series which may be used in various examples.

Yet still in other examples, sensitivity selection profiles 60' having diverse shapes are also possible using polynomial equations and changing one or more variables as shown in FIG. 5B. In this manner, a digital microprocessor may calculate the sensitivity without relying on the expense or unavailability of memory elements to store thousands of look up values. A plurality of numerical curves that represent motor control sensitivity profiles 50 based on $Y=X^a$+initial speed are plotted in FIG. 5B. These numerical curves are labeled $X^1$, $X^2$, etc. to denote the raised polynomial used but actual formulas can include scalar and offset values such as $Y=c*X^a+b$, where "a" is the raised polynomial value, "b" is an offset value, and "c" is a scalar value. In this example, these profiles 161-169 are a family of simple raised polynomial curves of the type $Y=X^a$+initial speed where exponent "a" can be any positive rational number typically within 0.01 to 100, and more specifically 0.25 to 8. A conventional constant speed tool has the form $Y=c*X^0$ (note that $X^0=1$) where "c" is the speed adjustment. In this example, X represents the derived force 35 axis having derived force range 33 from none (0) to some determined max derived force based on design parameters such as the maximum load of the motion actuator 14 and signal transformation requirements of the controller. The value Y represents the observed operational speed of the working surface 16 by operator 12. The family of curves define a space bounded by two simple polynomial curves, one having an exponent a=0.01 and the second having a=100, wherein "a" takes on all possible values between 0.01 and 100 generating a family of curves of infinite number fitting within the bounded space. Moreover, the bounded space defined by $Y=X^{0.01}$ and $Y=X^{100}$, where X=0 to $X_{max}$=maximum derived force and Y=0 to $Y_{max}$=maximum observed speed, may include any curve of arbitrary curvature with the bounded space (such as in FIG. 5A), and not just simple polynomial curves. As an example, in FIG. 5A, first and second s-shaped profiles 68, 69 shown would be contained within the space delimited by $Y=X^{0.01}$ and $Y=X^{100}$ whereas the profile $Y=c*X^0$ of a conventional constant speed tool would not be wholly contained.

Accordingly, in some examples, the number of sensitivity profiles that are made available to an operator 12 to choose may be limited to a finite number of two or more profiles. These sensitivity profiles may be represented in digital form by way of a data structure held with a physical (tangible) non-transitory memory element, wherein the data element includes a multi-dimensional array containing a plurality of one-dimensional sub-arrays, each sub-array containing a series of micro-processor readable data elements, wherein each of the data elements represents a binary or other encoded value that is conveyed by a microprocessor unit to a digital-to-analog converter unit to be output to the controller 20 as an analog voltage or power signal. The ensemble of binary data elements in each sub-array represents a pre-calculated sensitivity profile for selected use as sensitivity profile 50. Alternatively, the sensitivity profiles may be represented by equations or algorithms in computer readable code, or analog electronic, pneumatic, hydraulic, or other mechanical means and executed during operation.

Figure 6A:
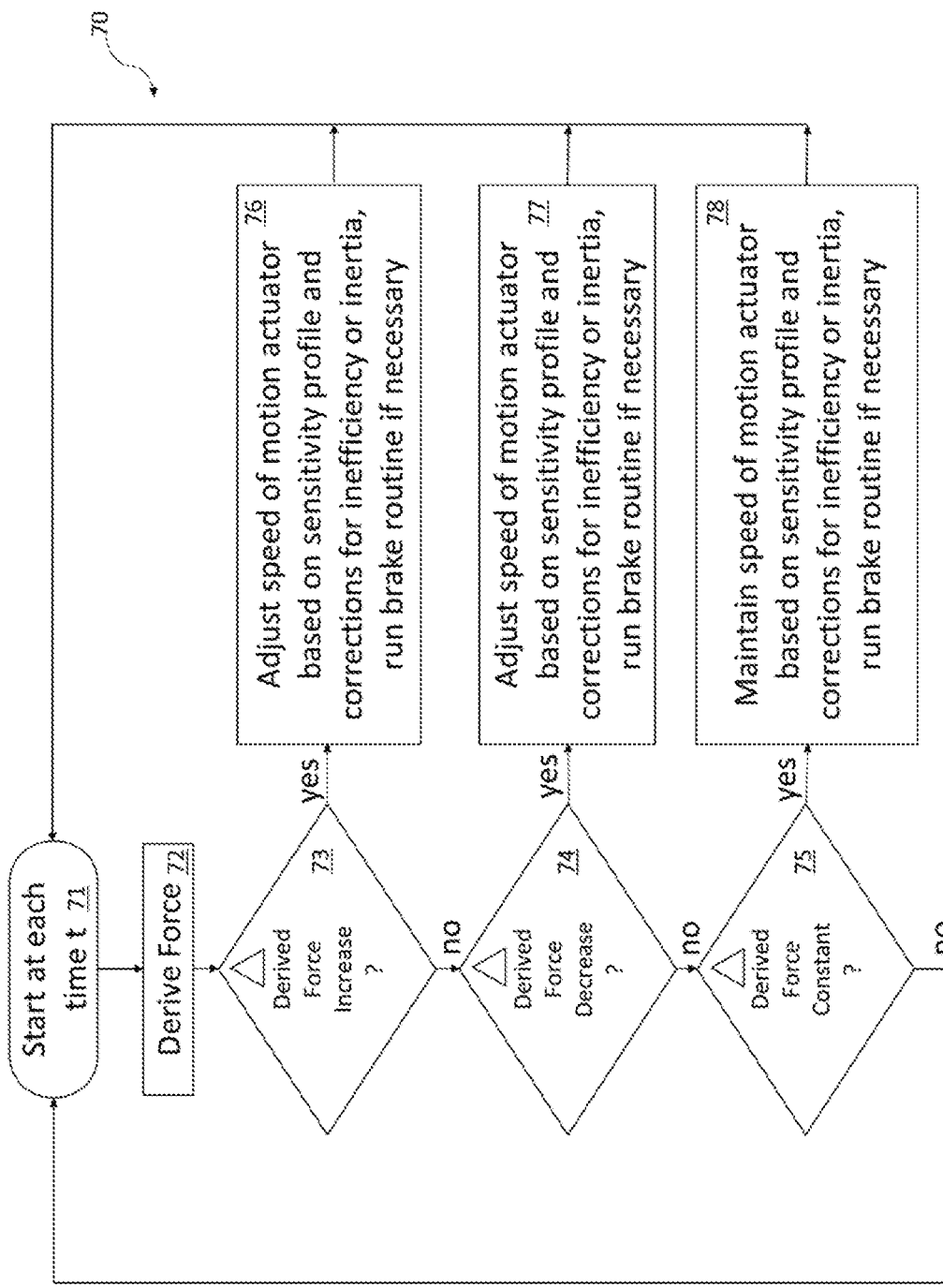
FIG. 6A is a flowchart of an example method of controlling the speed of a tool based on a derived force on a workpiece by an operator.
Figure 6B:
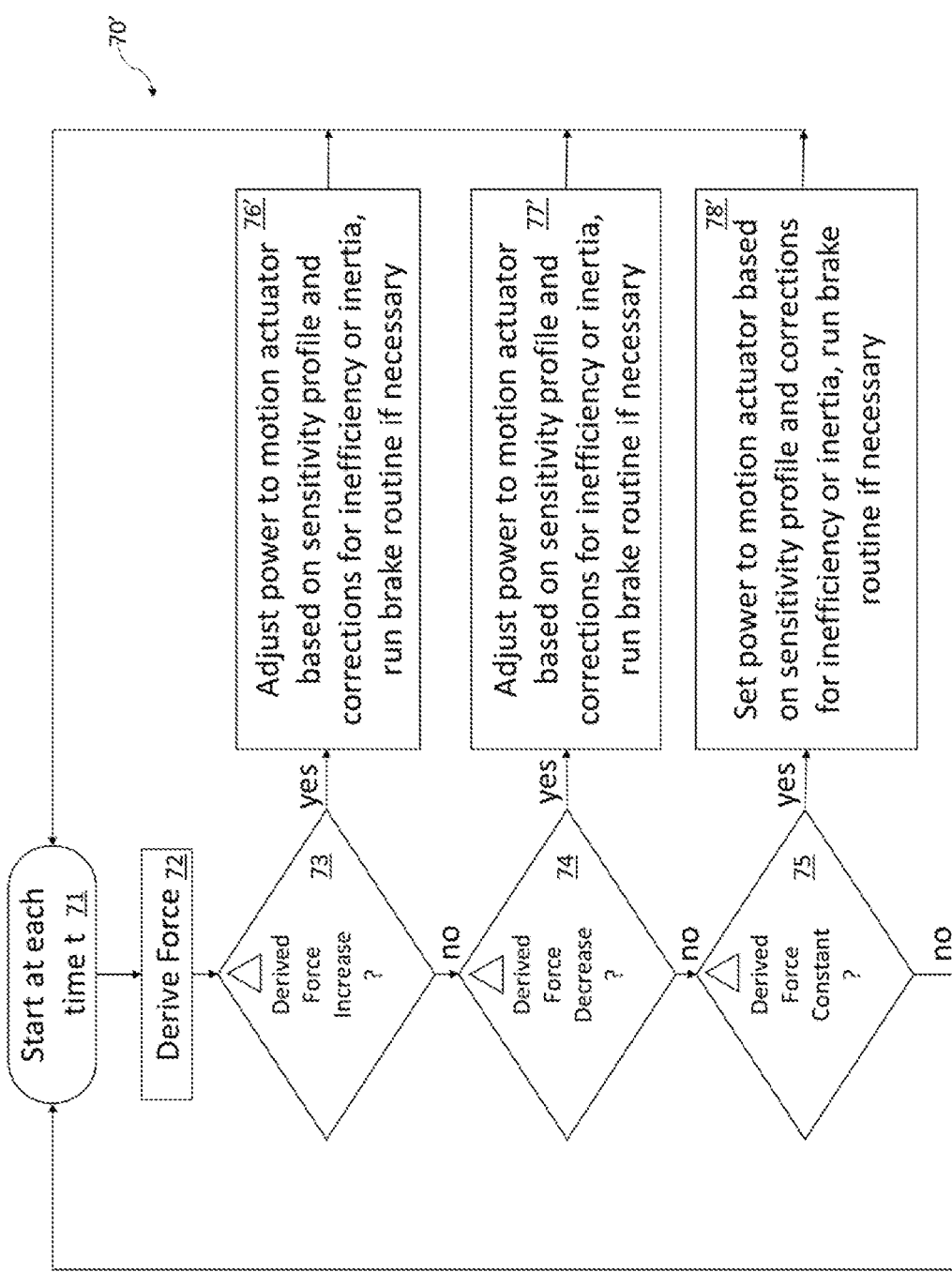
FIG. 6B is a flowchart of an example method of controlling the power of a tool based on a derived force on a workpiece by an operator.

FIGS. 6A and 6B are flowcharts 70 and 70' for an "Alberti Algorithm" of two example methods for implementing the power tool 10 examples with controller 20 for sensitivity profiles 50. Controller 20 may be coupled to one or more sensors or other detection techniques to help derive the amount of force exerted on workpiece 28 by operator 12 to emulate or virtualize force detector 18. For instance, force detector 18 can receive input from sensors capable of sensing mechanical loads, such as motor torque and axial or radial load on the tool. In other examples, force detector 18 may receive electrical signals that allow for the detection of motor current, motor RPM (speed), hydraulic pressure, air pressure, acoustic waveforms, or optical signals. The controller 20 may include a microprocessor, a digital signal processor, analog processing, ladder controller, an algorithmic control unit, hard-coded logic, a field programmable array, state machine, or combinations thereof. In one example, the controller 20 has a clock circuit which generates a signal at a fixed time interval or alternatively an event driven signal based upon detected changes in sensor input. When a clock signal is used, the sensors can be sampled at some chosen time interval t, for example every ⅒ seconds or 100 ms although any value from 1 ns to multiple seconds is possible, particularly ¹⁄₁₀₀ seconds or 10 ms, or the sensors may be sampled multiple times per interval t and then averaged, or processed, with current, or past value sets, to arrive at the value that will be used.

At each time interval t, the controller 20 may begin a routine at start block 71 to adjust the speed of the motion actuator 14 and working surface 16. First, the Force Detector 18 determines the amount of force exerted on the workpiece 28 in derive force block 72 to create a derived force 35. The controller 20 may have tangible non-transitory computer readable memory in which it can store previous, current, and future derived forces to be able to determine the rate of change of the derived force, the rate at which that rate of change is occurring, and may also apply filtering to remove unwanted noise or other errors which may arise. When a derived force is determined in derive force block 72, it can be compared with one or more previous readings (delta—Δ) to determine if the derived force is increasing in decision block 73 by a first predetermined threshold. If the derived force is increasing over the first predetermined threshold, then the controller 20 may in block 76 adjust to increase or decrease the speed in FIG. 6A or, alternatively in block 76' in FIG. 6B, adjust to increase or decrease the power to the motion actuator 14 based on the currently selected sensitivity profile 50 (increase or decrease based on respective increasing or decreasing sensitivity profile 50 region) or a function that enacts sensitivity profile 50. In either example, corrections for inefficiency or inertia can also be made. The corrections for inefficiency or inertia may be positive or negative or a combination thereof depending on the characteristics of the particular system. The sensitivity profile 50 may also be stored in computer readable memory accessible by controller 20 or it may be generated by analog circuitry and read by controller 20 via an A/D convertor circuit or, by use of a comparator, compared against a calculated value. Once the power to the motor actuator 14 has been increased the flow goes back to the start block 71 to await the next t cycle.

If the derived force is determined to not be increasing by the first predetermined threshold in decision block 73, then a determination is made using one or more previous readings whether the derived force is decreasing by a second predetermined threshold in decision block 74. If the derived force is decreasing by at least the second predetermined threshold, the controller may adjust to decrease or increase the speed in block 77 in FIG. 6A, or adjust to decrease or increase the power in block 77' in FIG. 6B, to the motion actuator 14 based on the currently selected sensitivity profile 50 (decrease, increase, or maintain based on respective decreasing, increasing, or flat sensitivity profile 50 region). Once again, in either example, corrections for inefficiency or inertia can be made. The first predetermined threshold may be the same or different than the second predetermined threshold and both act as a form of hysteresis to help stabilize the tool.

Depending on the implementation, there may be more inertial momentum with the motion actuator 14 and the working surface than can be adequately compensated for by just decreasing the power. In such a situation, the controller 20 may also provide braking as necessary, either mechanical or electrical. In some examples, it may be required to alternately reduce power and brake independently, particularly if the motion actuator uses common electrical motor coils for both drive and braking and especially if the derive force signal also depends on the electrical motor coil. The alternating power reduction and braking can be done in a single time interval t or it can be alternatively done in different time intervals t depending on the chosen t interval period and the design criteria for how much lag time can occur between a detected force transition and return to steady state of the motion actuator. After the power reduction or braking functions have completed in block 77 in FIG. 6A or block 77' in FIG. 6B, the flow goes back to the start block 71 to await the next t cycle.

If the force is determined in block 75 to not be increasing by the first predetermined threshold or decreasing by the second predetermined threshold or the rate of change is only within a predetermined hysteresis threshold (to prevent rapid changes due to noise or other fluctuations), then in block 78 of FIG. 6A, the speed of, or in block 78' of FIG. 6B the power to the motion actuator is set and maintained based on the currently selected sensitivity profile 50 and flow returns to block 71 to await the next t cycle. If for some reason, the system determines that the current is not increasing, not decreasing or is not substantially constant and no action should be currently taken, then flow returns to block 71 to await the next t cycle. This set of thresholds allows for states of hysteresis within the control system to increase stability and allow for slight variations in operator applied force without making unneeded changes unless the change of derived force 35 meets designed thresholds.

In an example of power control, one can measure a motor's torque as one approach to arriving at a derived force 35 and use a power control algorithm to change the speed (RPM) of the motor. In order to simplify the illustration of power control, it is assumed in the following examples that the system has very high efficiency and very low rotational inertia. Various compensations, such as a higher power output required due to inefficiencies (such as friction, motor inefficiencies, etc.), or temporal energy corrections to compensate inertia (such as adding extra drive power for RPM increase or added braking for RPM decrease) may be done with additional algorithms and are not specifically considered for these examples but would be known to those persons of skill in the art.

The following power algorithms and any aforementioned compensations may be implemented by processors following instructions read from tangible non-transitory computer readable memory. Alternatively, the power algorithms and compensations can be pre-calculated or characterized for particular systems and stored as look-up tables, databases, or lists within the tangible non-transitory computer readable memory. In yet other example systems, the power algorithms may be implemented in analog form or be designed in as part of the inherent system architecture, including pneumatic, hydraulic, or mechanical controls that approximate desired control curves.

Definitions

T=measured torque
T max=maximum Torque
R=approximate (unmeasured) RPM
R max=maximum (unmeasured) RPM
P=output Power
InitialSpeed=RPM at zero workpiece torque (a constant that may be set, programmed, or hardwired)
M=a positive scaling factor either by design or by user choice Example 1

Example of power control to enact a straight line from point of zero torque and InitialSpeed to a point of maximum torque and maximum speed with a desired slope M=(R max−InitialSpeed)/T max:
Power Control to the motion actuator will approximate the speed relationship:

$$R=M*T+\text{InitialSpeed}$$

General Power Equation:

$$P=T*R$$

Desired RPM/Torque Relationship:

$$R=M*T+\text{InitialSpeed}$$

The above equations can be combined to get a power control formula:

$$P=T*(M*T+\text{InitialSpeed})$$

Figure 6C:
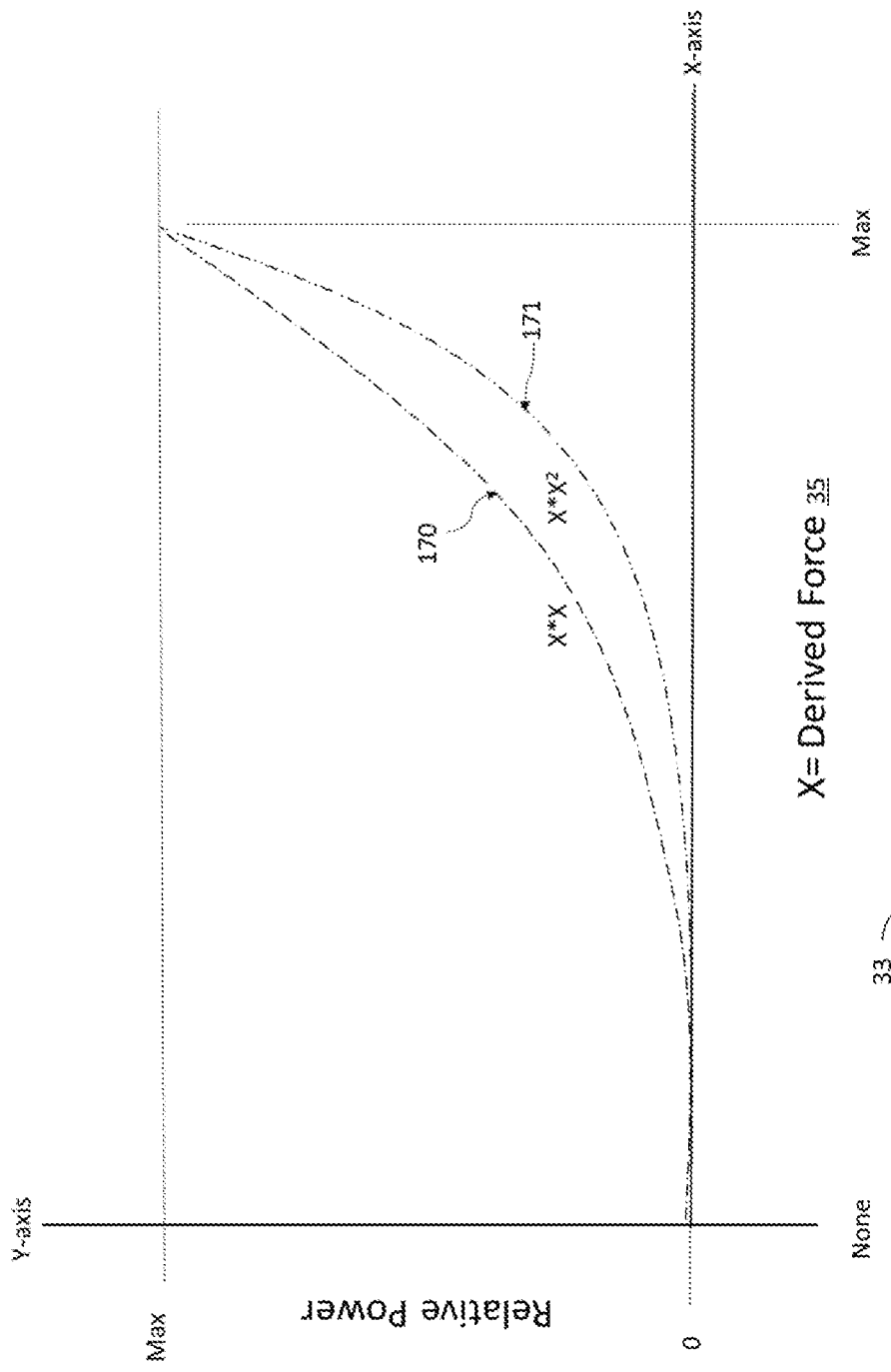
FIG. 6C is a graph showing a couple of example sensitivity profiles for power supplied to a working surface vs. derived force.

Note that this power control example implements a line similar to 164 in FIG. 5B with the consideration that torque is used to create the Derived Force 35 and RPM is the Observed Speed and the power is the two multiplied together. In terms of power, this form of control is also similar to the X*X line 170 in FIG. 6C with consideration that torque is analogous to X, or Derived Force 35.

Example 2

Example of power control to enact a scaled squared RPM relationship with torque from point of zero torque and InitialSpeed and having desired scaling factor M, M=(R max−InitialSpeed)/T max$^2$. Torque value may also be scaled by using the substitution of (K*T+J) for T in the final equation, where K and J are constants of choice:
General Power Equation:

$$P=T*R$$

Desired RPM/Torque Relationship:

$$R=M*T^2+\text{InitialSpeed}$$

Combine Equations to Get Power Control Formula:

$$P=T*(M*T^2+\text{InitialSpeed})$$

Note that this power control example implements a line similar to 165 in FIG. 5B with the consideration that torque is used to create the Derived Force 35 and RPM is the Observed Speed and the power is the two multiplied together. In terms of power, this form of control is also similar to the X*X$^2$ line 171 in FIG. 6C with consideration that torque is analogous to X, or Derived Force 35.

Figure 7:
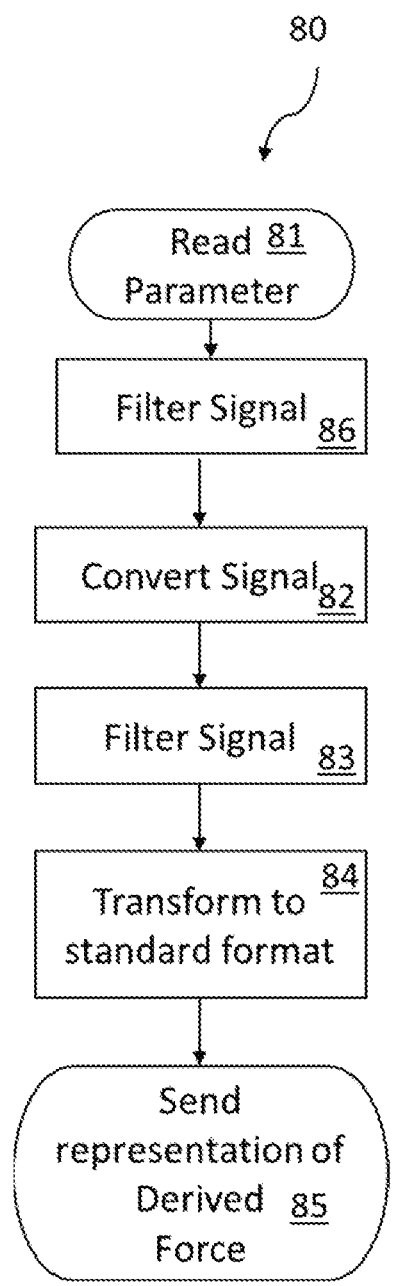
FIG. 7 is a flowchart of an example method of creating a standard derived force signal based off a read parameter.

FIG. 7 is an example flow chart 80 which the Force Detector 18, or a Controller 20 that incorporates a Force Detector 18, may use to read sensor or other sensory signals and convert to a standardized derived force signal. In block 81, a parameter from a sensor network of one of more sensors and indicators is read by Force Detector 18. In block 86, the parameter may be pre-filtered either with analog or digital processing to remove noise, correct for abnormalities or non-linearities, change scale, or remove undesired components or statistical aberrations. In block 82, the read parameter, or filtered version of it, is converted to an encoded digital signal which may be manipulated by the Force Detector 18. The converted digital signal is then filtered using analog or digital filtering or a combination thereof in block 83 to remove any unwanted noise, components, non-linearity, or statistical aberrations. The filtered signal is then in block 84 transformed mathematically into a standard format, such as by formula, look-up table, database, or other method. In block 85, the derived force is then sent to the controller 20.

FIG. 8 is an example of controller 20 actions for a sequence of time 't' intervals 91 to illustrate when both power reduction and braking occur in a system where motor current is proportional to motor torque. Also shown in columns are Events 92, RPM 93 (motor speed, unmeasured and unknown to system, but included for understanding), Motor burden 94 (unmeasured and unknown to system, but included for understanding), Measured Current 95, motor controller Mode and PWM (pulse-width modulated duty cycle) 96, Controller Notes 97, and RPM Notes 98. In this simplified braking example a motion actuator 14 is a motor rated at 2000 RPM (revolutions per minute) and 2 A (Amperes). In this simple example, the controller uses a sensitivity curve that is linear for currents between 400 mA and 1100 mA, such that the characterized RPM at manufacture had the same value as the current in mA (as will be shown, the controller RPM response will lag the desired RPM until a period of no burden changes allows settling). The value of the Measured Current 95 is utilized in this system as the Derived Force 35. No speed or RPM information is used in the algorithm of the controller 20 of this example and are shown for reference only, as an operator 12 may change the force exerted on the workpiece 28 based on observed speed of the motor and therefore vary the motor speed based on the desired rate of work. For this example, motor current cannot be measured while braking, in some examples, motor current may be measured while braking. Also, the burden 94 on the motor is not directly measured and is shown for reference only to help explain the algorithm. The burden 94 in this example is a moment of force, or torque represented in N*cm (Newton-centimeters).

Initially at t=0 in this example, the operator 12 has workpiece 28 pushed into the working surface 16 and is creating 100 N*cm (Newton-centimeters) of torque on the motor. The tool 10 is in steady-state at 1000 RPM and 1 A (1,000 mA). Then, over the next 0.5 seconds, the operator 12 reduces the workpiece force 33 to 50 N*cm or ½ of the previous torque load. In this example, the control loop implemented by controller 20 is on 100 ms intervals but may be more typically 10 ms intervals. However, to better illustrate the changes occurring and keep the number of time intervals reasonable for explanation, a longer period has been chosen. The physical system in this example is illustrated to respond in sampled or discrete steps and assumes a very low inertia to help illustrate the changes occurring. For this example, some physical effects were simplified and math was rounded. Motor burden 94 (the motor load) is not measured by the controller, but rather given as a condition stemming from operator control. Motor burden 94 is stated in N*cm, time (t) 91 is in 100 ms intervals, measured current 95 to the motor is in mA (1/1000 A) and the power applied to the motor is pulse width modulated (PWM) 96 in a duty cycle shown as a percentage of full (100%). Event 92 describes action of the workpiece 28 in relation to time (t) 91. Controller notes 97 indicate results from actions taken by controller 20 due to operator force changes. Other notes 98 illustrate the expected RPM 93 of speed based on controller actions.

At time t=0 the tool is in an initial steady-state, the RPM of the motor is 1000 and the load is 100 N*cm. The motor is drawing 1 A or 1000 mA as measured and the controller 20 is driving the motor at a 50% PWM duty cycle of full power. This 50% PWM duty cycle for the initial steady-state drive PWM % is derived from a stored sensitivity profile 50.

At time t=1, as noted by event 92, the operator 12 had reduced the workpiece force against the tool resulting in a load of 90 N*cm on the motor. This reduced load caused the motor current to drop to 900 mA and, however, because there is a reduced load on the motor, its speed has increased to 1100 RPM which is in the opposite direction of what is desired.

For instance, when the operator 12 initially reduces the workpiece force against the tool, the motor has the same drive level but experiences less load and may likely speed up and the controller 20 will need to react to reduce the motor speed generally to stay on the sensitivity profile 50. Various tool inefficiencies and drag, due to friction, air flow, etc., help to counteract the undesired motor speed-up, as does the actual workpiece load on the working surface, but they are not accounted for in this simplified example. Additionally, for systems with high moment of inertia, the speed-up will be attenuated. However, for large workpiece load decreases that demand large desired lower speed changes to the motor, braking may be needed. Tools with a higher moment of inertia will require a larger change in rotational kinetic energy (RKE) that will especially benefit from braking, for example when fitted with heavy sanding disk fixturing. For such tools to decrease their RPM, there must be a corresponding loss of RKE. To enact high RPM loss requires more energy dissipation due to more loss of RKE. Some factors where a high relative RKE amount may need to be quickly absorbed when an operator decreases the derived workpiece force (which creates a corresponding load decrease on the motor) are:

1. Operator quickly lowers load;
2. A large tool moment of inertia;
3. A high tool speed;
4. A loss in workpiece derived force occurs across a steep slope on the selected sensitivity profile;
5. A high system efficiency relative to the RKE loss (i.e. low frictional factors for spinning, this is true for most systems, however systems with low efficiency compared to the RKE loss need less braking since the inefficiencies naturally slow the speed and often need not be considered); and
6. Operator enacts a large decrease in load.

Because some sensitivity profiles require a reduction in tool speed (or RPM) for reductions in workpiece force, combinations of the various factors above may require energy dissipation that is well suited to braking. However, small RKE decreases due to small motor load changes, or that occur at low speeds, or that occur slowly, or that occur when the selected sensitivity profile slope is "shallow" (i.e. near zero-slope, not steep) may not need braking due to the other slowing factors such as workpiece load, air friction or system inefficiencies. Thus, a braking command might require a minimal amount of derived load (current in this example) change before it occurs. The actual level of braking may depend on any, or, all of the above factors.

The RKE for an active portion of many tools (for example, all tool spinning parts that are connected to the working surface, such as a sandpaper disk, a disk mount, a motor shaft, etc.) may be described by:

$$RKE = \tfrac{1}{2} * I * w^2$$

where:
RKE is the rotational kinetic energy
I is the moment of inertia relative to the stationary portion of the tool
w is the working surface rotational speed in radians per second
Since RPM is the rotations per minute of the motor and there are 2π radians per rotation and 60 seconds per minute, then:

$$w = (2*\pi)/60)*RPM = (\pi/30)*RPM$$

$$RKE = \tfrac{1}{2}*I*w^2 = \tfrac{1}{2}*I*((\pi/30)*RPM)^2 = (I*\pi^2/1800)*RPM^2$$

The amount of energy to transition to a lower RKE, say from an RKE1 having RPM1 to an RKE2 having RPM2, where RKE1>RKE2, may be described as:

$$\Delta RKE = (I*\pi^2/1800)*(RPM1^2 - RPM2^2)$$

This ΔRKE is the energy that must be dissipated for an RPM change and this energy is therefore proportional to a difference in the squares of the two rotational speeds. Because this "Alberti Algorithm" does not require a controller to measure and react to tool speed (although it could do so in some implementations), the ΔRKE for many systems cannot be exactly known, however, approximations may be utilized based on the above factors, which indicate when higher braking PWM may be needed, and may be found at either run time (factors 1, 3, 4, 6), or the design phase of the product (factors 2, 5) and be accordingly compensated for.

At time t=2, the controller 20 compensates by applying a braking period for 10% of the time interval to slow the speed of the motor to 900 RPM or a reduction of 200 RPM. The braking percentage (PWM duty cycle) had been previously customized for the system given the rate of speed change, inertia, time and other considered factors from the list above to adequately converge on the sensitivity curve. Meanwhile, as the operator 12 continues to lessen the applied force on the workpiece 28, the load on the motor drops to 80 N*cm. However, as braking is being applied, this system does not monitor current, though other systems may have circuitry in place to do so.

At time t=3, the controller begins driving the motor again at a power duty cycle of 25% which is a fraction of the target power level based off the stored sensitivity profile 50 because braking is active. During this time period, due to the motor being driven, the motor current can be measured and is determined to be 700 mA.

At time t=4, because the controller 20 has determined at t=3 that the current is decreasing and hence the derived load, the controller applies the brake again but at a 15% duty cycle to continue to slow down the motor's speed to 700 RPM. Again, because breaking is occurring, the motor current cannot be read. However, the operator is continuing to reduce the workpiece force and at this point the motor load is 60 N*cm.

At time t=5, the controller 20 begins to drive the motor again but at a reduced duty cycle of 12.5% which is half of the previous drive level at time t=3. This drive allows for current measurement which is measured at 500 mA. This measured current is a result of a workpiece derived load of 50 N*cm. The motor speed for reference is still 700 RPM.

At time t=6, the controller 20 applies breaking again at 15% duty cycle as the current in the previous cycle t=5 was determined to be decreasing from the prior measured cycle t=3. This braking causes the speed of the motor to undershoot to a level of 400 RPM. Again, due to this being a braking cycle, the motor current is undetermined. However, the operator 12 continues to exert a force on the workpiece 28 which associates to a motor load of 50 N*cm.

At time t=7, the motor speed has continued to decrease to 350 RPM and the controller 20 continues to drive the motor at a duty cycle of 12.5% of full power. A current measurement is taken from the motor and it is measured at 500 mA and a workpiece derived load of 50 N*cm. This is the same value as measured at time t=5 as the load is now constant.

At time t=8, since the current 95 is substantially constant, the controller sets the driving duty cycle at the value determined by the sensitivity profile 50 and the current 95. This increased drive level then causes the motor to increase its speed to 450 RPM as it begins to catch up to the expected steady-state level of 500 RPM.

At time t=9, the operator continues to impart a workpiece load of 50 N*cm and the controller measures a motor current of 500 mA which is substantially the same as previously in time t=8 so the controller continues to drive the motor at a 25% duty cycle determined by the sensitivity profile 50 and the current level. The RPM is now indicated to be 500 RPM and will continue to remain at that speed until the operator applies more or less force to the workpiece 28.

Figure 9:
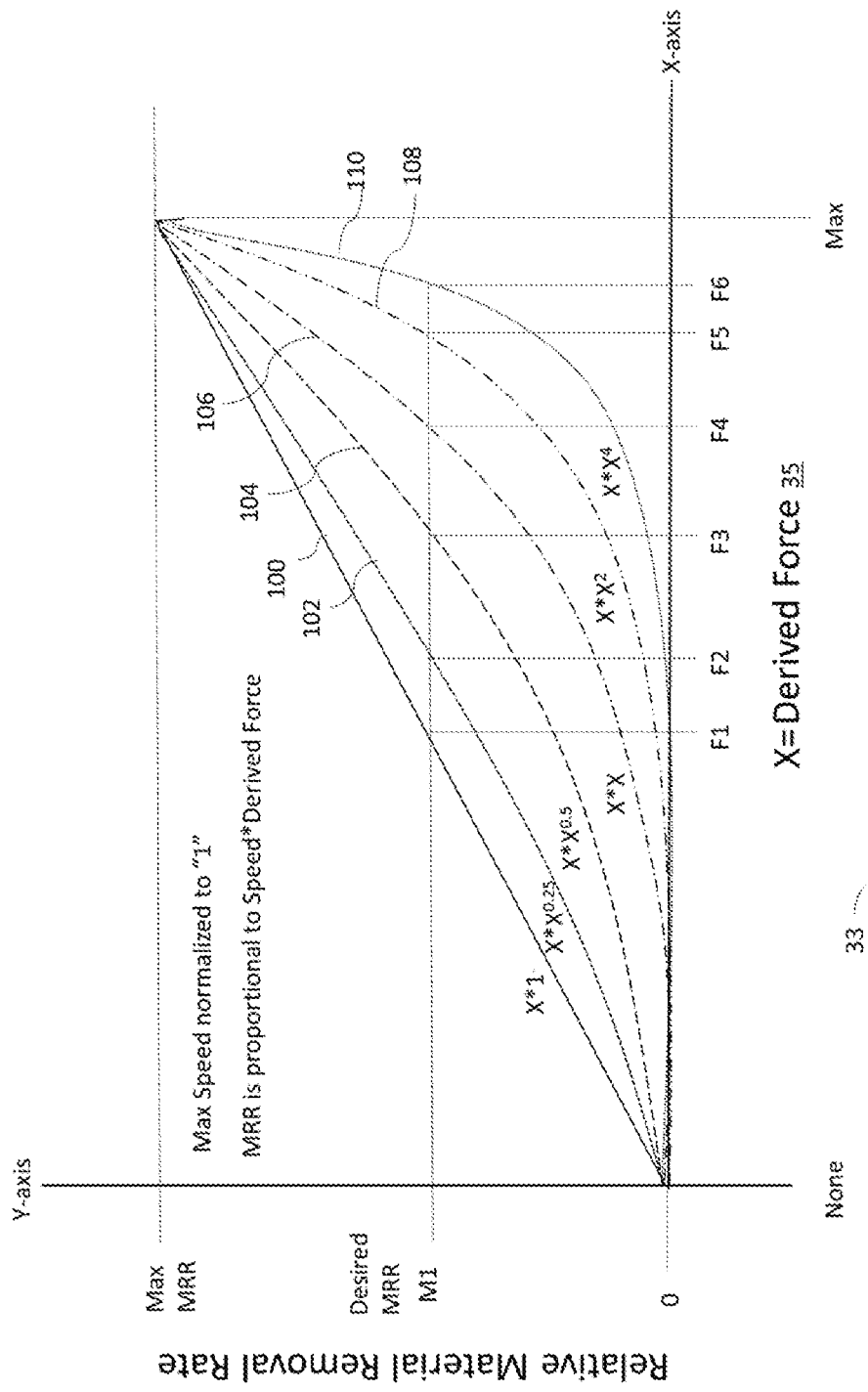
FIG. 9 is a graph showing several example sensitivity profiles with respect to relative material removal rates.

FIG. 9 is a graph of a normalized approximate material removal rate vs. derived force for an abrasive tool operating at a fixed speed and several examples of the tool operating at force responsive speeds having different sensitivity profiles 50. In this example, the fixed speed 100 is set to the max speed for the tool and normalized to "1". The derived force detected at the working surface is the "X-axis value." The material removal rate (the rate of work in this example) is approximately the RPM of the working surface times the torque at the physical working surface axis, as represented by the derived force. Accordingly, the maximum material removal rate (mrr) for any given derived force within the operating range is mrr profile 100, or the function: X*1 for the tool operating at maximum fixed speed. The maximum material removal rate for mrr profile 100 occurs when the workpiece is maximally engaged. The minimum material removal rate for mrr profile 100 is 0*1 or zero when the workpiece is not engaged. For the tool operating at any force responsive speed, the approximate material removal rate is the derived force "X", at a consistent point of engagement, times the RPM of the working surface, which is from the sensitivity line. Thus, for mrr profile 102, the approximate material removal rate is labeled as $X*X^{0.25}$ where $X^{0.25}$ is the associated sensitivity RPM. For mrr profile 104, the approximate material removal rate is labeled as $X*X^{0.5}$. Similarly for approximate mrr profiles 106, 108, 110, they are labeled as $X*X$, $X*X^2$, and $X*X^4$, respectively.

Note that for a given desired material removal rate M1, a derived force of F1 is measured when operating the tool at a fixed max speed. For all mrr profiles 102, 104, 106, 108, and 110, their sensitivity profiles allow the tool to increase the measured amount of derived force (representing the actual force) necessary to achieve the same desired material removal rate M1. That is, the derived force F2 for mrr profile 102 is greater than F1. Similarly, F3 is greater than F1 and F2, F4 is greater than F1-F3, F5 is greater than F1-F4, and F6 is greater than F1-F5. Each of the mrr profiles 102-110 extends the range of force that can be used to adjust both the speed of the tool and the desired material removal rate to achieve Desired MRR M1, thus allowing an operator to skillfully craft the workpiece with finesse without abruptly removing too much material or causing the workpiece to jump or otherwise not accurately engage as desired on the working surface of the tool. Stated differently, for substantially all of the derived force range, other than the starting zero force and the max derived force endpoints, the material removal rate is less than a respective material removal rate for the tool operating at a fixed max speed.

Figure 10:
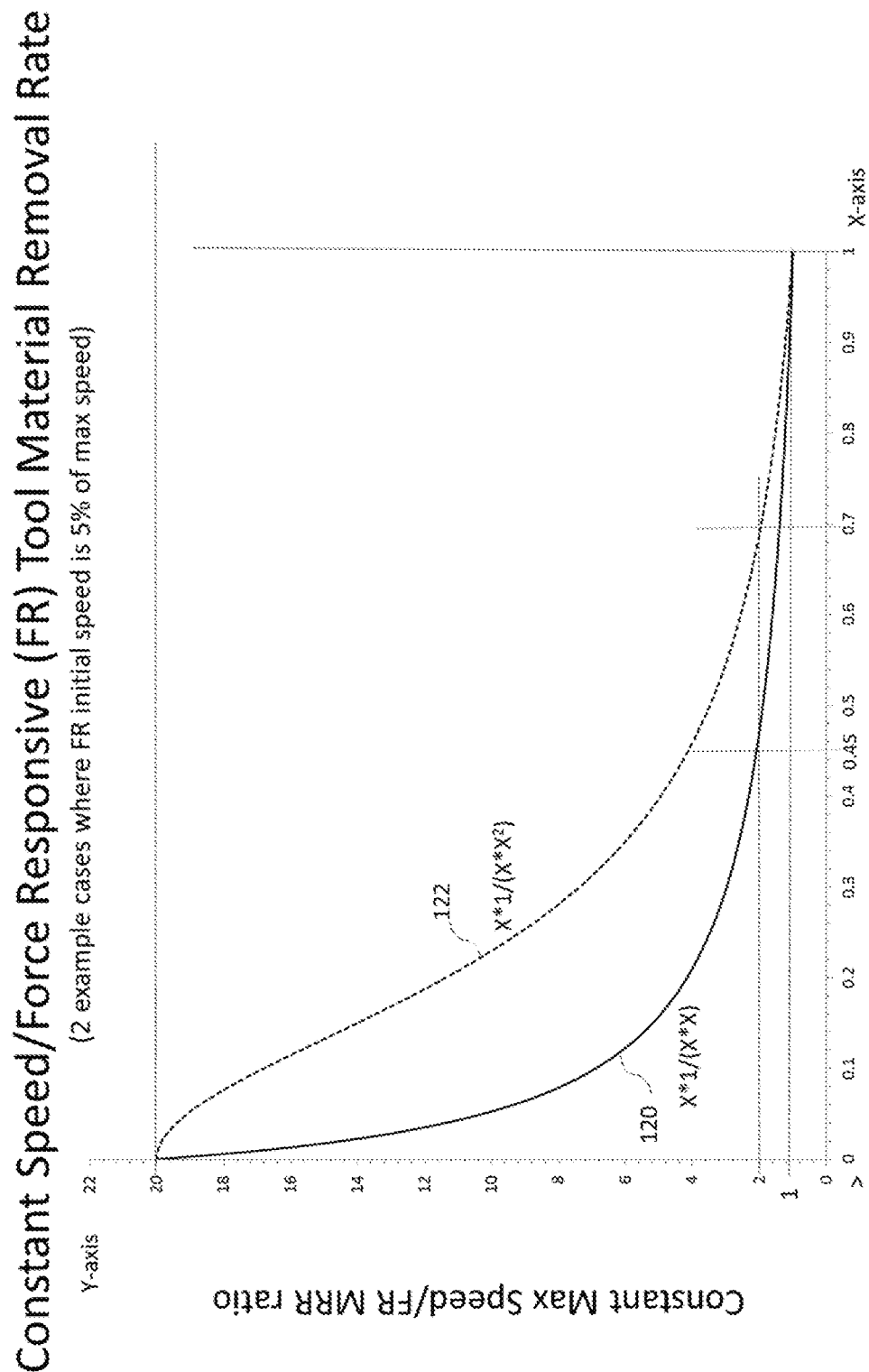
FIG. 10 is a graph showing a couple example ratios of constant speed and force responsive tool material removal rates.

FIG. 10 is another graph which illustrates the different material removal rate ratios between the tool operating at a fixed max speed and with a couple of force responsive sensitivity profiles that allow the power tool 10 to have the speed responsive to the derived force. The X-axis is now a normalized Derived Force 35' where the max force available is set to "1" and the minimum force is just over "0" or as shown on the graph ">0". Zero is not shown on the X-axis because the ratio is 0/0, zero divided by zero, which is undefined in this case. These force endpoints correspond to a max speed and an initial speed on the force responsive tool and, specifically for this example, the initial speed is 5% of the max speed. The Y-axis is a ratio of the material removal rate (the rate of work) for the tool operating at a constant max speed and the tool operating in a force responsive (FR) manner using sensitivity profiles. Here, when the tool is operating at a constant max speed, the material removal rate follows the mrr profile 100 in FIG. 9. When the tool is operating in a force responsive manner, such as mrr profile 106 of FIG. 9, it has a different material removal rate vs. derived force. Plot 120 in FIG. 10 shows the ratio $(X*1)/(X*X)$ of (mrr profile 100)/(mrr profile 106). As the normalized derived force 35' approaches zero force, the mrr profile 106 removes 20 times less material. As the normalized derived force 35' approaches "1", mrr profile 106 removes the same amount of material as mrr profile 100 due to the tool operating at the same max speed in each instance. At about 45% of the normalized derived force 35' range, the mrr profile is still able to remove ½ the material as compared to the tool operating with mrr profile 100. Thus, a considerable amount of force variance (from 0 to 45% of the total work load force) can be used by an operator to finesse and greatly control the rate of work and functional speed of the working surface, yet still have more than half the normalized derived force range (from 45% to 100%) to operate the tool where fast material removal is still possible. That is, at least 10% of the normalized derived force range of the work load force allows for at least a ½ reduction in the rate of work (mrr) relative to a rate of work (mrr) at the tool max speed 59 at an equivalent work load force. Productivity is increased as the workpiece no longer would need to be transferred between a first power tool and a finishing tool to achieve high rate of work (mrr) and fine finishing of the work, respectively.

Plot 122 in FIG. 10 illustrates another example where the normalized force range can be expanded further for finessing the workpiece. In this example, the ratio is $(X*1)/(X*X^2)$ when using mrr profile 100 and mrr profile 108 from FIG. 9. Again, as the normalized derived force 35' approaches zero, the tool with mrr profile 108 is removing $\frac{1}{20}^{th}$ the amount of material as for mrr profile 100 (a constant max speed). However, for the tool with mrr profile 108, an operator can apply a force range from 0 to 70% before having the tool remove ½ the amount of material as mrr profile 100. This mrr profile 108 allows the operator the ability to remove large amounts of material at the same rate as profile 100 but also extends the range of control for finessing of a workpiece or working to exacting standards. For example, a power tool 10 for operating on a workpiece 28 includes a motion actuator 14 coupled to a working surface 16 to engage the workpiece 28. A controller 20, coupled to the motion actuator 14, receives a signal 35 representing a work load force the workpiece 28 exerts on the working surface 16. The controller 20 both: a) sets a functional speed of the working surface 16 between an initial speed 55 at a first force and a tool max speed 59 at a second force, and b) at all work load forces greater than the first force and less than the second force, lowers a rate of work at the functional speed relative to a rate of work at the tool max speed 59 at an equivalent workload force. Further, the rate of work at the functional speed may be lowered by at least a factor of 2 for at least 10% (percent) of a force range between the first force and the second force.

Figure 11:
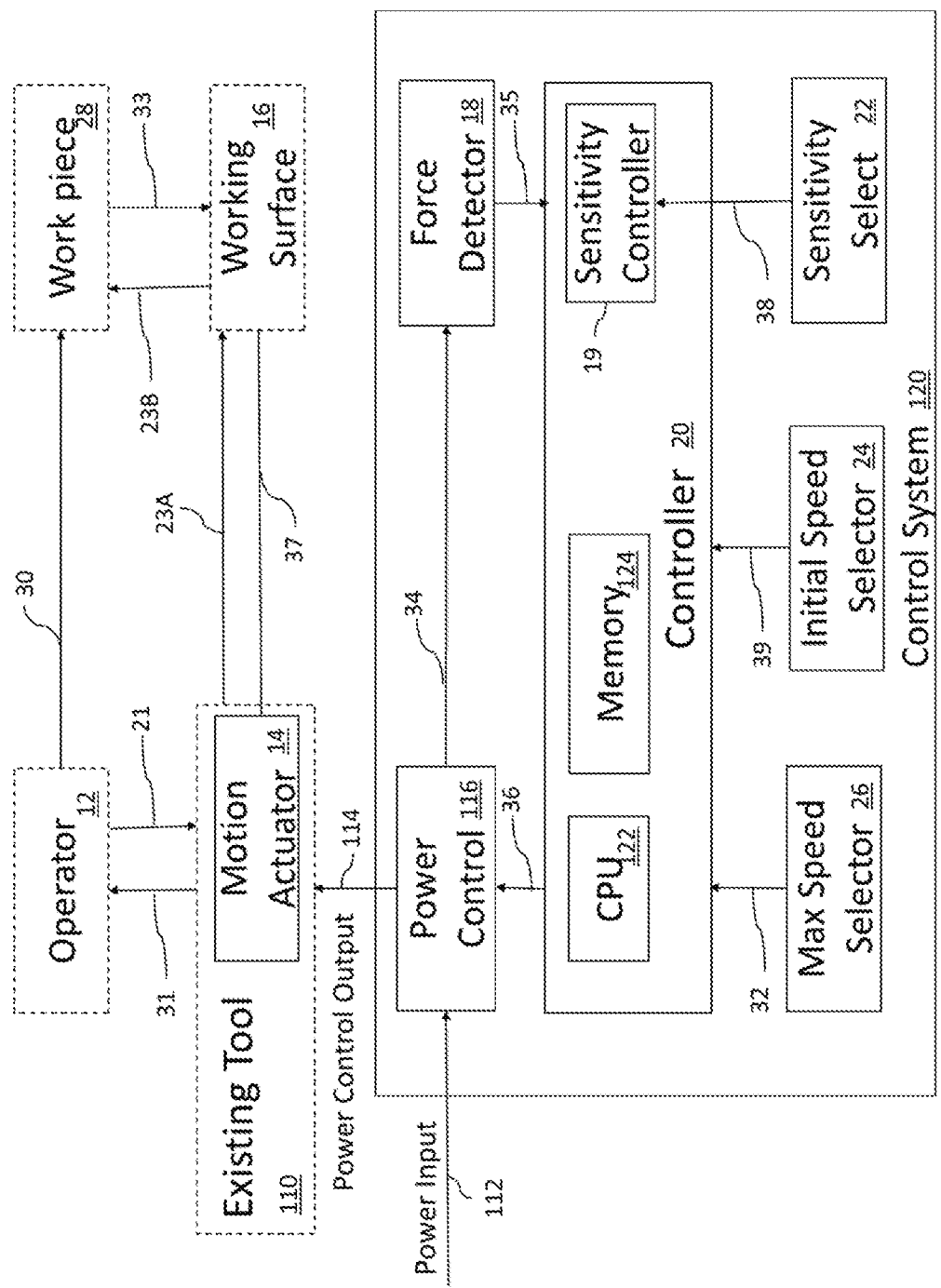
FIG. 11 is a block diagram of an example control system that may be used with an existing tool whereby an operator can fashion a workpiece incorporating the concepts described herein

FIG. 11 is an example block diagram of a control system 120 that an existing tool 110 using a working surface 16 can implement with the concepts described herein. Many existing tools 110, such as an angle grinder, can run directly from line power input 112 or have a setting such that the speed of the existing tool 110 follows the level of the input line voltage to the tool.

These type of tools are typically built with universal motors or brushed DC motors as motion actuator 14. A universal motor's torque varies with current squared. A brushed DC motor's torque and current have a direct relationship. However, in each case for motion actuator 14 in existing tool 110, the amount of force exerted by an operator 12 on a workpiece 28 can be detected and derived by monitoring one or more electrical properties, such as current, in the power control output 114 supplied to the existing tool 110. As different tools draw different current levels and have different torque-current relationships, the controller 20 may be customized and/or calibrated for various existing tools.

The motion actuator 14 of existing tool 110 actuates a working surface 16 which operates on a workpiece 28, either by having an operator 12 apply an operator force 30 on the workpiece 28 which transfers force to the working surface 16 or by having the operator 12 apply an operator-tool force 21 on the existing tool 110 and the existing tool 110 indirectly applying that force on the workpiece 28 via indirect tool forces 23A to the working surface 16 and 23B from the working surface 16 to the workpiece 28. The existing tool 110 may include the working surface 16, which is configured to engage the workpiece 28. Existing tool 110 may be alternately configured to couple to working surface 16 so it can be interchanged as necessary. The existing tool 110 includes motion actuator 14 that is coupled 37 to the working surface 16.

A controller such as controller 20 is coupled 36 to a power control 116 circuit to control the amount of power delivered by the power control output 114 to the existing tool 110 and the working surface 16. This power control may be done typically by controlling the voltage output, but controlling current and phase, or combinations thereof, are also possible. A force detector 18 is coupled to the power control 116 circuit via force value 34, and force detector 18 is used to detect one or more of the current, voltage, power, or phase(s) delivered to existing tool 110. Force value 34 represents the force, load, or pressure on the working surface 16, which an operator 12 applies to the workpiece 28 on the working surface 16. The force detector 18 is configured to receive the force value 34 and output a signal that represents a derived force 35. The controller 20 may include a central processing unit (CPU) 122 or microcontroller and tangible non-transitory computer readable memory 124 having instructions for executing on the CPU 122 to allow the controller 20 to adjust the power control output 114 from power control 116 based on the force value 34 via the force detector 18. The controller may also be implemented with digital logic, analog circuitry or a combination thereof. The controller 20 may include a sensitivity controller 19 to allow the operator 12 to control with finesse simultaneously both a rate of work from the workpiece and a speed of the motion actuator of existing tool 110 based on a predetermined continuous response in sensitivity profile 50 (see FIG. 3 and FIGS. 5A & 5B) to the amount of force applied by the operator 12 on the workpiece 28 at the working surface 16.

The controller 20 may be configured to increase the power to the working surface 16 via power control 116 when the controller 20 and/or force detector 18 determines an increase in force above a first predetermined amount and to decrease the power to the working surface 16 when the controller 20 and force detector 18 determines a decrease in force above a second predetermined amount. The controller 20 may also be configured to maintain the power to the working surface 16 when the force detector 18 determines no substantial change in force.

The force detector 18 may be a standardized force detector representing a predetermined force-output function independent of how the amount of direct force 30 (or indirect forces 21 and 23A and 23B) the operator 12 applies on the workpiece 28 is derived. The force detector 18 may determine the operator force applied to the workpiece 28 as force value 34 using a voltage sensor, current sensor, power sensor, frequency sensor, phase sensor, or another electrical property sensor or combinations thereof could be used. Accordingly, as there are many different possible ways to sense or otherwise derive the force the operator applies to the workpiece, the force detector 18 may convert a received signal into a standard format so that the controller 20 programming does not necessarily need to be updated for different types of tool implementations, just force detector 18.

Other possibilities to configure controller 20 are possible. The controller 20 may allow for selection of an initial speed as a minimum speed using an initial speed selector 24 via an initial speed input 39 and a max speed using a max speed selector 26 via a max speed input 32. The sensitivity profile 50 (see FIG. 3) applied to the amount of derived force on the workpiece at the working surface may be configured to only vary in a range between a selected initial speed and a selected max speed. However, there may be multiple sensitivity profiles 50 (see FIGS. 5A, 5B & 6C) available for an operator to choose from depending on operator preference and the type of work to be performed on the workpiece. This selection can be done with a sensitivity selector 22 via a sensitivity input 38. The sensitivity selector 22 may be configured to select and apply one of two or more sensitivity profiles (see FIGS. 5A, 5B, & 6C) that represent the desired predetermined continuous response 50. While the sensitivity profile 50 may represent the relationship between the derived force on the work-piece 28 and observed speed or power (as a proxy) applied to the motion actuator in existing tool 110, the controller 20 of control system 120 may control the power control output 114 to the motion actuator 14 in existing tool 110 in discrete steps over multiple time periods that approximate using the sensitivity profile 50 as a digital calculation, reference look-up or table, to set the operating speed of the working surface. The controller's 20 use of the sensitivity profile 50 allows any tolerances and other variability of the motion actuator 14 in existing tool 110, controller 20, and force detector 18 to be compensated for by the finessed control of the operator 12 as he/she applies their artisan or skilled abilities to the workpiece 28 or existing tool 110.

In summary, many examples have been described above. The power tool 10 and control system 120 with existing tool 110 examples have many advantages and increased utility over conventional power tools. For instance, the derived force-speed response can be tailored for delicate tool operations such as finessing a workpiece by a skilled artisan to achieve a material removal rate that is more controlled than currently possible. Further, the power tool 10 and control system 120 examples allow for more accurate initial engagement of the workpiece. This advantage allows for improved operator control over the starting alignment of the workpiece with respect to conventional tools such as the blade of power saws and cutters, drills, and abrading surfaces of power sanders and power grinders and other power tools.

Other advantages include a reduced wandering of drill bits on surfaces where drilling a pilot hole or center punching is too difficult or near impossible to center the drill bit. For instance, as on very hard and smooth surfaces like metal, the power tool 10 and control system 120 examples allow the drill to operate at slow speed over a wide range of force or pressure applied to the tool to allow the drill bit to form a shallow indentation in the workpiece surface at a desired location to restrain the drill bit from moving laterally.

Likewise, reduced skating or jerking of a hand-held tool or workpiece is now possible with the power tool 10 and control system 120 examples. By allowing initial speeds from zero to a slow finite speed at low loads, a workpiece that engages the tool will not initially encounter a speed high enough to create erratic workpiece engagement, or workpiece damage. This advantage allows the operator to grip the workpiece and apply a sufficient force or pressure on the workpiece when engaging it to the tool's working surface without sudden unexpected movement of the workpiece. The operator is able to now align the workpiece with sufficient muscular force and maximal dexterity to control the alignment of the workpiece with respect to the tool, and the rate of work with hand or other pressure to the workpiece.

While the present invention has been particularly shown and described with reference to the foregoing examples, those skilled in the art will understand that many variations may be made therein without departing from the spirit and scope of the invention as defined in the following claims. This description should be understood to include all novel and non-obvious combinations of elements described herein, and claims may be presented in this or a later application to any novel and non-obvious combination of these elements. The foregoing examples are illustrative, and no single feature or element is essential to all possible combinations that may be claimed in this or a later application. Where the claims recite "a" or "a first" element of the equivalent thereof, such claims should be understood to include incorporation of one or more such elements, neither requiring nor excluding two or more such elements.

What is claimed is:

1. A tool for operating on a workpiece, the tool comprising:
   a motion actuator configured to be coupled to a working surface to engage the workpiece;
   a controller coupled to the motion actuator to responsively vary a speed of the motion actuator and an operating speed of the working surface within a range of an initial speed and a max speed, wherein the controller is configured, to change simultaneously both a rate of work on the workpiece and the operating speed of the working surface according to a sensitivity profile;
   characterized in that the controller is further configured to respond to a derived force that is a function an applied force exerted by an operator to manageably adjust pressure on the working surface to achieve a rate of work and thereby represents an amount of force the operator applies between the workpiece and the working surface, wherein the simultaneous change of rate of work and operating speed is manageable under both acceleration and deceleration by the operator with the applied force, wherein the sensitivity profile includes at least one region that expresses a relationship of a monotonically increasing positive slope between the derived force and the operating speed of the working surface within the range, and wherein the controller is further configured to compare the derived force with previous readings of the derived force to determine if the derived force is increasing or decreasing by a predetermined threshold before varying the operating speed of the working surface.

2. The tool of claim 1, further comprising a force detector coupled to the controller and configured to output a signal representing the derived force, wherein the controller is further configured to receive the signal from the force detector.

3. The tool of claim 2, wherein the force detector is configured to output a standardized predetermined force-output function in dependent of a method of detection of the amount of force the operator applies on the workpiece.

4. The tool of claim 2, wherein the sensitivity profile response allows for variances of the motion actuator, the controller, and force detector to be compensated for by the operator manageably adjusting workpiece pressure as necessary to get a desired speed of the working surface and the rate of work.

5. The tool of claim 1, wherein the sensitivity profile is calculated using a polynomial equation.

6. The tool of claim 1, wherein the sensitivity profile includes a monotonically decreasing region.

7. The tool of claim 6, wherein the sensitivity profile has an arch profile that has a curve that arcs up to the max speed and then arches down with increasing derived force.

8. The tool of claim 7, wherein a high point of the arch profile is set by at least one of the operator, at manufacture, and a temperature reading.

9. The tool of claim 8, wherein the controller allows for selection of at least one of the initial speed and the max speed, and the predetermined sensitivity profile in the controller is configured to only respond in a range between a selected initial speed and a selected max speed.

10. The tool of claim 9, wherein the selection of the initial speed and the max speed set the lower and upper speed bounds, and the controller scales the sensitivity profile within the initial and max speed bounds.

11. The tool of claim 1, wherein the operator is allowed to manipulate the shape of the sensitivity profile.

12. A tool for operating on a workpiece, the tool comprising:
a motion actuator configured to be coupled to a working surface to engage the workpiece;
a controller coupled to the motion actuator to responsively vary a speed of the motion actuator and an operating speed of the working surface within the range of an initial speed and a max speed, and configured to respond to a derived force that is a function of an applied force exerted by the operator to manageably adjust pressure on the working surface to achieve a rate of work and thereby represents an amount of force an operator applies between the workpiece and the working surface, wherein the controller is further configured, under both acceleration and deceleration, to allow the operator with the applied force to manageably change simultaneously both a rate of work on the workpiece and the operating speed of the working surface according to a sensitivity profile expressing a relationship of a monotonically increasing positive slope between the derived force and the operating speed of the working surface within the initial speed and the max speed, wherein the controller is configured to:
derive a first derived force during a first time interval;
set a first operating speed based on the sensitivity profile;
derive a second derived force during a second time interval;
when the second derived force is greater than the first derived force by a first predetermined amount, adjusting to a second operating speed based on the sensitivity profile and the second derived force;
when the second derived force is less than the first derived force by a second predetermined amount, adjusting to a third operating speed based on the sensitivity profile and the second derived force; and
when the second derived force is determined to be less than the first derived force plus the first predetermined amount and greater than the first derived force minus the second predetermined amount, adjusting to a fourth operating speed based on the sensitivity profile and the second derived force.

13. The tool of claim 12, wherein the controller is further configured to:
determine a selection of an initial speed and a max speed, and
wherein the predetermined sensitivity profile is configured to only respond in a range between a selected initial speed and a selected max speed; and
wherein when the second force is derived and it is determined that the first force applied by the operator has been removed, adjust a fifth operating speed to the initial speed.

14. The tool of claim 12, wherein the controller is further configured to:
determine a selection of one of two or more sensitivity profiles that represent the predetermined sensitivity profile.

15. The tool of claim 12, wherein to derive a first force and derive a second force occur in discrete steps over multiple time intervals.

16. The tool of claim 12, wherein the predetermined sensitivity profile allows tolerances of a motion actuator, a controller, and a force detector to be compensated for by the operator manageably adjusting workpiece pressure as necessary to get a desired speed of the working surface and the rate of work.

17. A control system for a tool to operate on a workpiece, the control system comprising:
a controller configured to couple to a motion actuator to responsively vary the amount of power delivered by the motion actuator to a working surface of the tool, and further configured to couple to a force detector configured to output a signal representing a derived force that is a function of an applied force exerted by an operator to manageably adjust pressure on the working surface to control an operating speed between an initial speed and a max speed and thereby represents an amount of force the operator applies between the workpiece and the working surface, wherein the controller is further configured, under both acceleration and deceleration, to receive the signal from the force detector and allow the operator with the applied force to manageably change simultaneously both a rate of work on the workpiece and the operating speed of the working surface according to a sensitivity profile that includes at least one region expressing a relationship of a monotonically increasing positive slope between the derived amount of force and the operating speed of the working surface within the initial speed and the max speed, wherein the sensitivity profile allows for variances of the motion actuator, the controller, and the force detector to be compensated for by the operator manageably adjusting workpiece pressure as necessary to get a desired speed of the working surface and the rate of work, and wherein the controller is further configured to compare the derived force with previous readings of the signal to determine if the derived force is increasing or decreasing by a predetermined threshold before varying the operating speed of the working surface.

18. The control system of claim 17, wherein the controller is further configured to:

utilize a standardized format force detector representing a predetermined force output function independent of the method of detection of the amount of force applied on the workpiece; and receive the standardized format to allow a controller implementing the method to be used with multiple tools.

19. The control system of claim 17, wherein the controller is further configured to determine a selection of one of two or more sensitivity profiles that represent the predetermined sensitivity profile.

20. The control system of claim 17, wherein the sensitivity profile includes a monotonically decreasing region.

21. A tool for operating on a workpiece, the tool comprising: a motion actuator configured to be coupled to a rotating working surface to engage the workpiece with an assembly having a non-zero inertia; a controller coupled to the motion actuator to responsively vary a speed of the motion actuator and an operating speed of the rotating working surface within the range of an initial speed and a max speed, and configured to respond to a derived force that is a function of an applied force exerted by an operator to manageably adjust pressure and alignment of the workpiece on the rotating working surface to achieve a rate of work and thereby represents an amount of force the operator applies between the workpiece and the rotating working surface, wherein the controller is further configured, under both acceleration and deceleration, to allow the operator with the applied force to manageably change simultaneously both the rate of work on the workpiece and the operating speed of the rotating working surface according to a sensitivity profile expressing a relationship of a monotonically increasing positive slope between the derived force and the operating speed of the rotating working surface within the initial speed and the max speed, wherein the controller is configured to compare the derived force with previous readings to determine if the derived force is increasing or decreasing by a predetermined threshold before varying the operating speed of the rotating working surface, and wherein the predetermined threshold allows for states of hysteresis with offsets from the sensitivity profile to increase stability, correct for the non-zero inertia, and allow for variations in the applied force exerted by the operator.

22. The tool of claim 21, wherein the controller controls power to the motion actuator in discrete steps over multiple time periods to set the operating speed of the rotating working surface and adapt the speed of the motion actuator within a sufficient time period with the offsets from the sensitivity profile once a change of derived force meets designed thresholds.

23. A method of controlling a power tool, comprising the steps of: deriving a first force applied by an operator to a workpiece onto a rotating working surface coupled to an assembly having a non-zero inertia during a first time interval; setting a first operating speed of the rotating working surface coupled to a motion actuator based on a predetermined continuous response profile expressing a relationship of a monotonically increasing positive slope between a derived force and an operating speed of the rotating working surface within an initial speed and a max speed, wherein the derived force is a function of an applied force exerted by the operator to manageably adjust pressure and alignment of the workpiece on the rotating working surface to achieve the operating speed of the rotating working surface between the initial speed and the max speed and thereby represents an amount of force the operator applies between the workpiece and the rotating working surface to allow the operator with the applied force to manageably change simultaneously both a rate of work on the workpiece and the operating speed of the rotating working surface under both acceleration and deceleration; deriving a second force applied by an operator onto the workpiece to the rotating working surface of the power tool during a second time interval; when the second force is greater than the first force by a first predetermined amount, adjusting to a second operating speed based on the predetermined continuous response profile and the second force; when the second force is less than the first force by a second predetermined amount, adjusting to a third operating speed based on the predetermined continuous response profile and the second force; when the second force is determined to be less than the first force plus the first predetermined amount and greater than the first force minus the second predetermined amount, adjusting to a fourth operating speed to the power tool based on the predetermined continuous response profile and the second force, and wherein the first and second predetermined amounts allow for states of hysteresis with offsets from the sensitivity profile to increase stability, correct for the non-zero inertia, and allow for variations in the applied force exerted by the operator.

24. A control system for a tool to operate on a workpiece, the control system comprising: a controller configured to couple to a motion actuator to responsively vary the amount of power delivered by the motion actuator to a rotating working surface of the tool with an assembly having a non-zero inertia, and further configured to couple to a force detector configured to output a signal representing a derived force that is a function of an applied force exerted by an operator to manageably adjust pressure and alignment of the workpiece on the rotating working surface to control an operating speed between an initial speed and a max speed and thereby represents an amount of force the operator applies between the workpiece and the rotating working surface, wherein the controller is further configured, under both acceleration and deceleration, to receive the signal from the force detector and allow the operator with the applied force to manageably change simultaneously both a rate of work on the workpiece and the operating speed of the rotating working surface according to a sensitivity profile expressing a relationship of a monotonically increasing positive slope between the derived force and the operating speed of the rotating working surface with in the initial speed and the max speed, wherein the controller is configured to compare the derived force with previous readings to determine if the derived force is increasing or decreasing by a predetermined threshold before varying the speed of the operating speed of the rotating working surface, and wherein the predetermined threshold allows for states of hysteresis with offsets from the sensitivity profile to increase stability, correct for the non-zero inertia, and allow for variations in the applied force exerted by the operator.

25. A tangible non-transitory computer readable medium for executing instructions on a computer, the medium including routines to: respond to a first derived force representing a first force applied by an operator from a workpiece onto a rotating working surface coupled to an assembly having a non-zero inertia during a first time interval, set a first operating speed of the rotating working surface coupled to a motion actuator based on a predetermined continuous response profile expressing a relationship of a monotonically increasing positive slope between a derived force and an operating speed of the rotating working surface within an initial speed and a max speed, the derived force is a function of an applied force exerted by the operator to manageably adjust pressure and alignment of the workpiece on the workpiece to control the operating speed of the rotating working surface between the initial speed and the max speed to allow the operator to manageably change simultaneously both a rate of work on the workpiece and the operating speed of the rotating working surface under both acceleration and deceleration; respond to a second derived force representing a second force applied from the workpiece onto the rotating working surface of the power tool during a second time interval; when the second derived force is greater than the first derived force by a first predetermined amount, adjust a second operating speed based on the predetermined continuous response profile and the second force; when the second derived force is less than the first derived force by a second predetermined amount, adjust a third operating speed based on the predetermined continuous response profile and the second force; when the second derived force is determined to be less than the first derived force plus the first predetermined amount and greater than the first force minus the second predetermined amount, apply a fourth operating speed to the power tool based on the predetermined continuous response profile and the second force, and wherein the first and second predetermined amounts allow for states of hysteresis with offsets from the sensitivity profile to increase stability, correct for the non-zero inertia, and allow for variations in the applied force exerted by the operator.

26. A power tool for operating on a workpiece, the tool comprising: a motion actuator coupled to a rotating working surface to engage the workpiece with an assembly with a non-zero inertia; a controller coupled to the motion actuator and configured to receive a signal of a derived force that is a function of an applied force exerted by an operator to manageably adjust pressure and alignment of the workpiece on the rotating working surface to control an operating speed between an initial speed and a max speed and thereby representing a work load force applied by an operator that the workpiece exerts on the rotating working surface, and the controller is further configured to: a) set a functional speed of the rotating working surface between the initial speed at a first force and the max speed at a second force based on a predetermined continuous response profile expressing a relationship of a monotonically increasing positive slope between the work load force and the operating speed of the rotating working surface within the initial speed and the max speed to allow the operator to manageably change simultaneously both a rate of work on the workpiece and the operating speed of the rotating working surface under both acceleration and deceleration; b) at all work load forces greater than the first force and less than the second force, lower a first rate of work at the functional speed relative to a second rate of work at the max speed at an equivalent workload force; and c) compare the derived force with previous readings to determine if the derived force is increasing or decreasing by a predetermined threshold before varying the functional speed of the rotating working surface, wherein the predetermined threshold allows for states of hysteresis with offsets from the sensitivity profile to increase stability, correct for the non-zero inertia, and allow for variations in the applied force exerted by the operator.

* * * * *